US012198412B2

(12) United States Patent
Nishio et al.

(10) Patent No.: US 12,198,412 B2
(45) Date of Patent: *Jan. 14, 2025

(54) INFORMATION PROCESSING DEVICE AND INFORMATION PROCESSING METHOD

(71) Applicant: SONY GROUP CORPORATION, Tokyo (JP)

(72) Inventors: Masato Nishio, Tokyo (JP); Yuhei Yabe, Tokyo (JP); Tomoo Mizukami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,626

(22) Filed: Nov. 14, 2023

(65) Prior Publication Data

US 2024/0078798 A1    Mar. 7, 2024

Related U.S. Application Data

(63) Continuation of application No. 17/052,035, filed as application No. PCT/JP2019/009537 on Mar. 8, 2019, now Pat. No. 11,847,822.

(30) Foreign Application Priority Data

May 9, 2018   (JP) ................................ 2018-090918
Aug. 23, 2018  (JP) ................................ 2018-156149

(51) Int. Cl.
*G06V 10/778*   (2022.01)
*G06F 18/21*    (2023.01)
(Continued)

(52) U.S. Cl.
CPC ........ *G06V 10/7784* (2022.01); *G06F 18/217* (2023.01); *G06F 18/41* (2023.01); *G06V 10/7788* (2022.01); *G06V 20/10* (2022.01)

(58) Field of Classification Search
CPC .......... G06V 10/7784; G06V 10/7788; G06V 20/10; G06F 18/217; G06F 18/41
See application file for complete search history.

(56) References Cited

U.S. PATENT DOCUMENTS 9,008,442 B2    4/2015  Wu et al.
2004/0215463 A1  10/2004 Aoyama et al.
(Continued)

FOREIGN PATENT DOCUMENTS

CN    103295011 A    9/2013
CN    104414590 A    3/2015
(Continued)

OTHER PUBLICATIONS

International Search Report and Written Opinion of PCT Application No. PCT/JP2019/009537, issued on May 28, 2019, 08 pages of English Translation and 08 pages of ISRWO.
(Continued)

*Primary Examiner* — David Perlman
(74) *Attorney, Agent, or Firm* — CHIP LAW GROUP

(57) ABSTRACT

An information processing device is provided that includes an operation control unit which controls the operations of an autonomous mobile object that performs an action according to a recognition operation. Based on the detection of the start of teaching related to pattern recognition learning, the operation control unit instructs the autonomous mobile object to obtain information regarding the learning target that is to be learnt in a corresponding manner to a taught label. Moreover, an information processing method is provided that is implemented in a processor and that includes controlling the operations of an autonomous mobile object which performs an action according to a recognition operation. Based on the detection of the start of teaching related to pattern recognition learning, the controlling of the operations includes instructing the autonomous mobile object to obtain infor- (Continued)

mation regarding the learning target that is learnt in a corresponding manner to a taught label.

24 Claims, 30 Drawing Sheets

(51) Int. Cl.
*G06F 18/40* (2023.01)
*G06V 20/10* (2022.01)

(56) References Cited

U.S. PATENT DOCUMENTS

| | | |
|---|---|---|
| 2009/0210090 A1 | 8/2009 | Takemitsu et al. |
| 2013/0202212 A1 | 8/2013 | Wu et al. |
| 2013/0345870 A1 | 12/2013 | Buehler et al. |
| 2014/0316636 A1 | 10/2014 | Hong et al. |
| 2017/0364239 A1 | 12/2017 | Gould et al. |
| 2018/0111274 A1 | 4/2018 | Seok et al. |
| 2018/0165518 A1 | 6/2018 | Assaf et al. |
| 2018/0173244 A1 | 6/2018 | Yoon et al. |
| 2019/0102377 A1 | 4/2019 | Neuman et al. |
| 2019/0213438 A1 | 7/2019 | Jones et al. |
| 2019/0313009 A1 | 10/2019 | Alameh et al. |

FOREIGN PATENT DOCUMENTS

| | | |
|---|---|---|
| CN | 105825268 A | 8/2016 |
| CN | 106651283 A | 5/2017 |
| CN | 107659608 A | 2/2018 |
| CN | 107977668 A | 5/2018 |
| JP | 2002140092 A | 5/2002 |
| JP | 2003-140710 A | 5/2003 |
| JP | 2003-345438 A | 12/2003 |
| JP | 2004-252111 A | 9/2004 |
| JP | 2005-128959 A | 5/2005 |
| JP | 2013-161391 A | 8/2013 |
| WO | WO-2016072132 A1 | 5/2016 |

OTHER PUBLICATIONS

Notice of Allowance for U.S. Appl. No. 17/052,035, issued on Aug. 11, 2023, 7 pages.
Non-Final Office Action for U.S. Appl. No. 17/052,035, issued on May 11, 2023, 31 pages.
Final Office Action for U.S. Appl. No. 17/052,035, issued on Jan. 13, 2023, 29 pages.
Non-Final Office Action for U.S. Appl. No. 17/052,035, issued on Jul. 5, 2022, 25 pages.
Final Office Action for U.S. Appl. No. 17/052,035, issued on Apr. 13, 2022, 27 pages.
Non-Final Office Action for U.S. Appl. No. 17/052,035, issued on Oct. 6, 2021, 23 pages.
Advisory Action for U.S. Appl. No. 17/052,035, issued on Mar. 17, 2023, 5 pages.
International Preliminary Report on Patentability of PCT Application No. PCT/JP2019/009537, issued on Nov. 19, 2020, 09 pages of English Translation and 05 pages of IPRP.

FIG.15
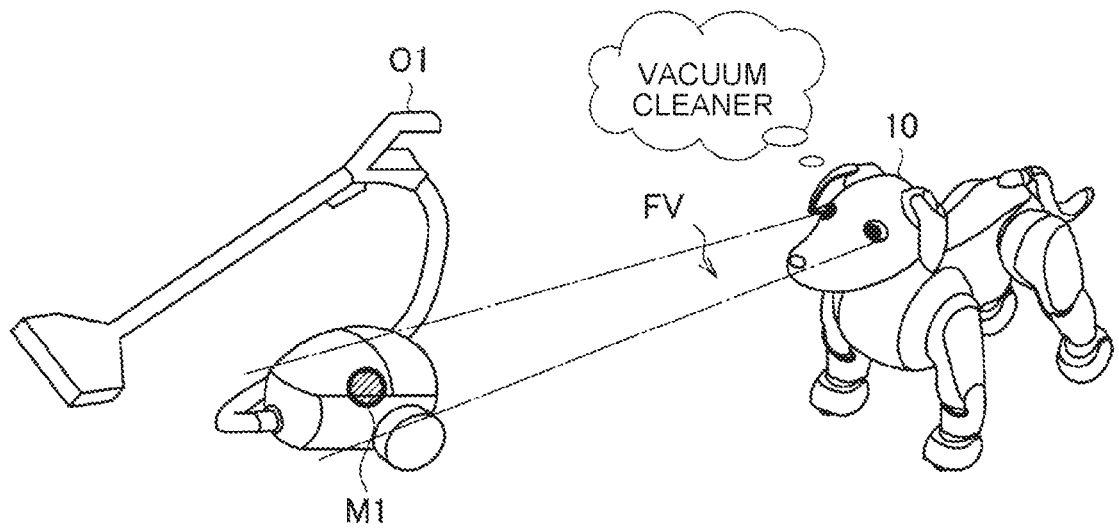
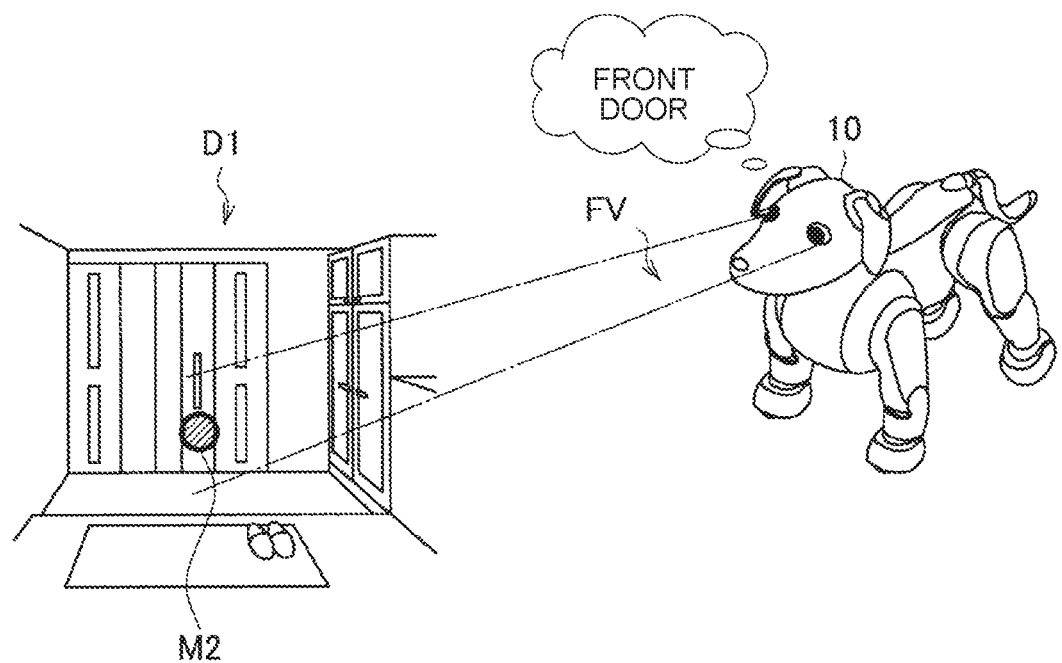

FIG.17
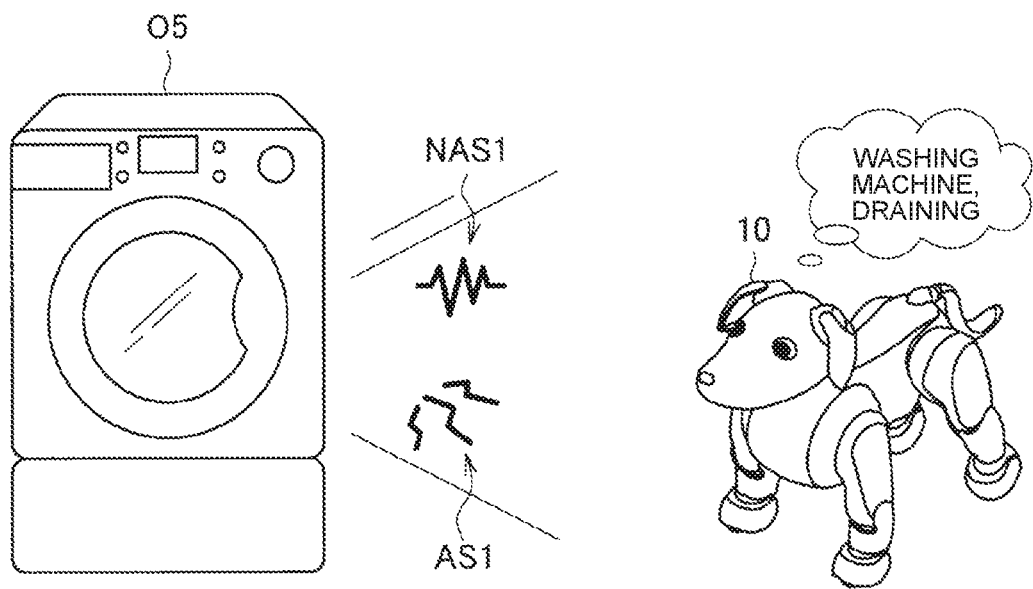
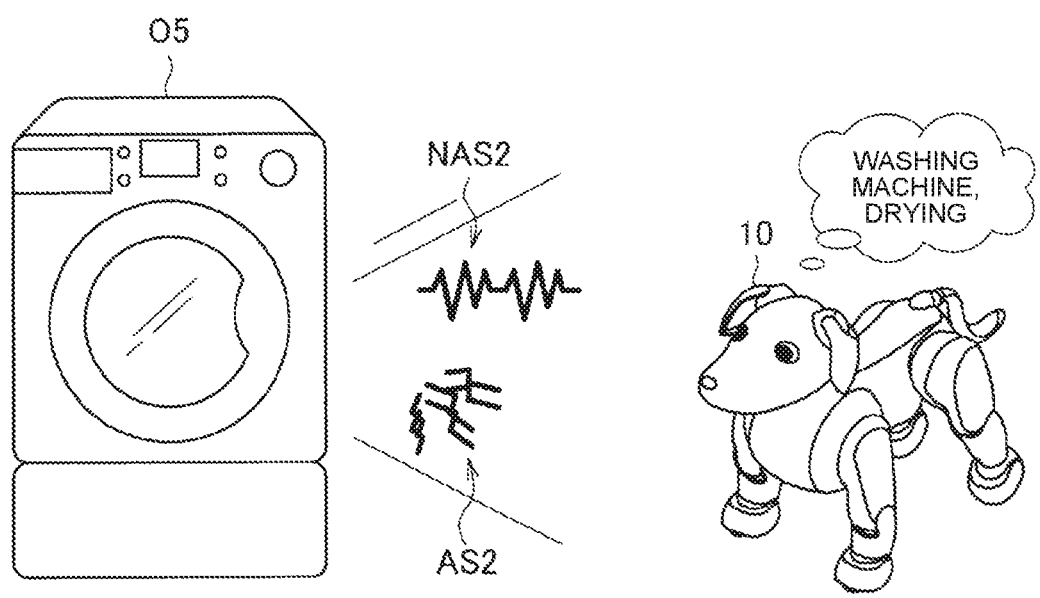

INFORMATION PROCESSING DEVICE AND INFORMATION PROCESSING METHOD

CROSS REFERENCE TO RELATED APPLICATIONS

This present application is a continuation application of U.S. patent application Ser. No. 17/052,035, filed on Oct. 30, 2020 which is a U.S. National Phase of International Patent Application No. PCT/JP2019/009537 filed on Mar. 8, 2019, which claims priority benefit of Japanese Patent Application No. JP 2018-156149 filed in the Japan Patent Office on Aug. 23, 2018 and also claims priority benefit of Japanese Patent Application No. JP 2018-090918 filed in the Japan Patent Office on May 9, 2018. Each of the above-referenced applications is hereby incorporated herein by reference in its entirety.

TECHNICAL FIELD

The application concerned is related to an information processing device, an information processing method, and a program.

BACKGROUND

In recent years, various devices equipped with the learning function have been developed. Such devices include autonomous mobile objects such as robots that perform autonomous operations based on estimated situations. Moreover, many technologies have been proposed to further diversify the available actions of such autonomous mobile objects. For example, in Patent Literature 1, a technology is disclosed in which new action patterns are created in accordance with the properties of other home information appliances, and the properties of the autonomous mobile object are accordingly varied.

CITATION LIST

Patent Literature

Patent Literature 1: Japanese Laid-open Patent Publication No. 2003-140710

SUMMARY

Technical Problem

Meanwhile, it is possible to think that the actions of an autonomous mobile object generally become more diversified in direct proportion to the number of targets recognizable by that autonomous mobile object. However, in order to substantially increase the number of targets, it becomes necessary to prepare a large volume of learning data related to the targets.

In that regard, in the application concerned, an information processing device, an information processing method, and a program in a new and improved form are proposed that enable learning related to pattern recognition with more efficiency.

Solution to Problem

According to the application concerned, an information processing device is provided that includes an operation control unit which controls the operations of an autonomous mobile object that performs an action according to a recognition operation. Based on the detection of the start of teaching related to pattern recognition learning, the operation control unit instructs the autonomous mobile object to obtain information regarding the learning target that is to be learnt in a corresponding manner to a taught label.

Moreover, according to the application concerned, an information processing method is provided that is implemented in a processor and that includes controlling the operations of an autonomous mobile object which performs an action according to a recognition operation. Based on the detection of the start of teaching related to pattern recognition learning, the controlling of the operations includes instructing the autonomous mobile object to obtain information regarding the learning target that is to be learnt in a corresponding manner to a taught label.

Furthermore, according to the application concerned, a program is provided that causes a computer to function as an information processing device including an operation control unit that controls the operations of an autonomous mobile object which performs an action according to a recognition operation. Based on the detection of the start of teaching related to pattern recognition learning, the operation control unit instructs the autonomous mobile object to obtain information regarding the learning target that is to be learnt in a corresponding manner to a taught label.

Advantageous Effects of Invention

As described above, according to the application concerned, learning related to pattern recognition can be performed with more efficiency.

Meanwhile, the abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 15 is a diagram for explaining about the teaching performed using a marker according to the first embodiment.

FIG. 17 is a diagram for explaining about the teaching performed using inaudible sounds according to the first embodiment.

DESCRIPTION OF EMBODIMENTS

Figure 1:
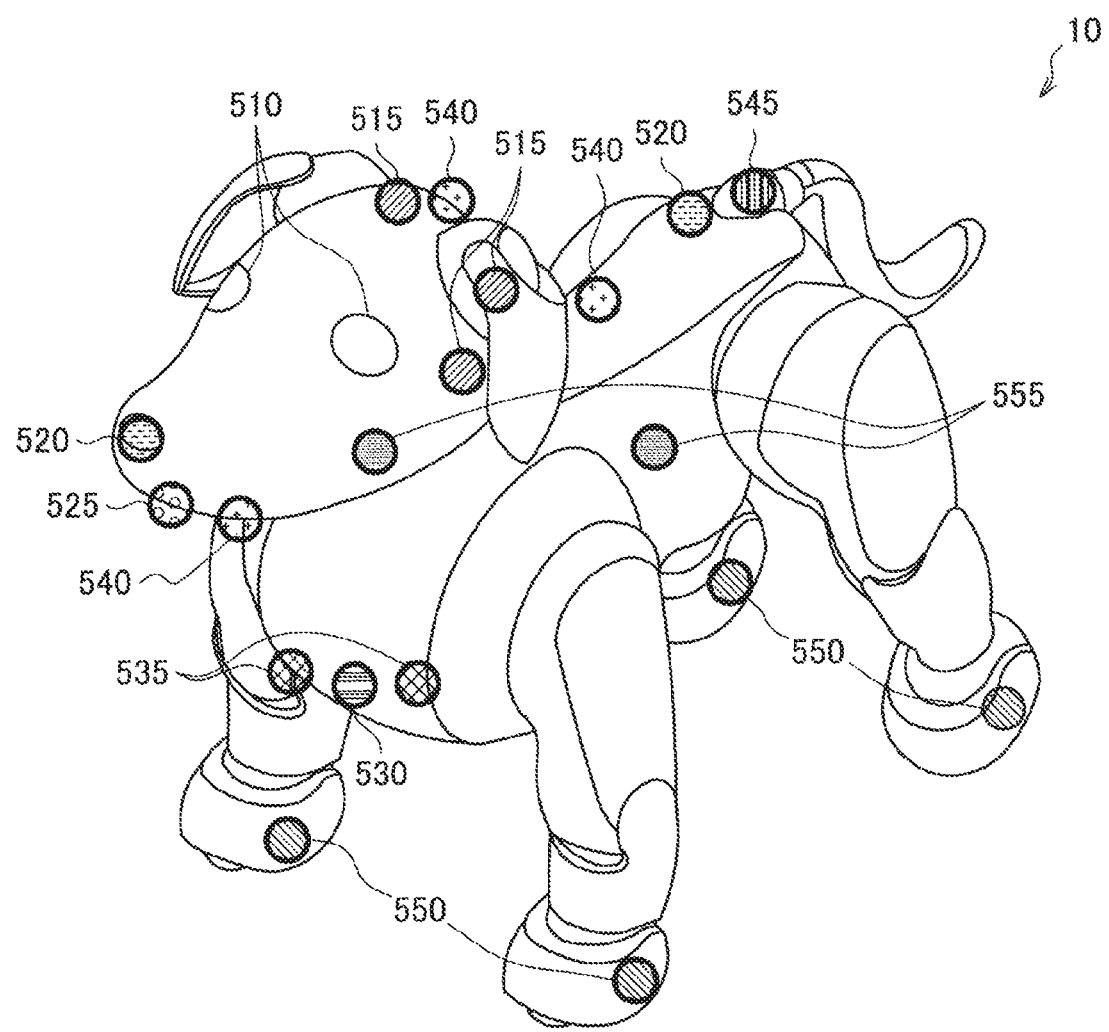
FIG. 1 is a diagram illustrating an exemplary hardware configuration of an autonomous mobile object according to a first embodiment of the application concerned.

Preferred embodiments of the application concerned are described below in detail with reference to the accompanying drawings. In the present written description and the drawings, the constituent elements having practically identical functional configuration are referred to by the same reference numerals, and the explanation is not given repeatedly.

The explanation is given in the following sequence.
1. First embodiment
 1.1. Overview of autonomous mobile object 10
 1.2. Exemplary hardware configuration of autonomous mobile object 10
 1.3. Exemplary system configuration
 1.4. Exemplary functional configuration of autonomous mobile object 10
 1.5. Exemplary functional configuration of information processing server 20
 1.6. Details of functions
 1.7. Flow of operations
1. First embodiment
 2.1. Overview
 2.2. Details of teaching using environmental map
 2.3. Flow of teaching-based learning using environmental map EM
3. Exemplary hardware configuration
4. Summary 1. First Embodiment «1.1. Overview of Autonomous Mobile Object 10»

Firstly, the explanation is given about the overview of an autonomous mobile object 10 according to a first embodiment of the application concerned. The autonomous mobile object 10 according to the first embodiment of the application concerned is an information processing device that performs situation estimation based on the collected sensor information, and autonomously selects and performs various operations depending on the situation. Unlike a robot that performs operations only by following user commands, one of the features of the autonomous mobile object 10 is to autonomously perform operations that are presumed to be the most suitable in each situation.

The autonomous mobile object 10 according to the first embodiment of the application concerned can perform, for example, user recognition or object recognition based on photographed images, and take various autonomous actions according to the recognized user or the recognized object. Moreover, for example, the autonomous mobile object 10 according to the first embodiment of the application concerned can perform speech recognition based on the speech of the user, and can take actions according to the instructions from the user.

At that time, in order to perform user recognition and object recognition, the features of the users and the objects need to be learnt in advance in a corresponding manner to labels. For example, as a result of performing teacher learning based on correct-answer labels that are provided, the autonomous mobile object 10 becomes able to recognize an object, which is extracted from an image, by associating the features of the object to a label.

On the other hand, in order to implement such teacher learning, such learning data is required in which correct-answer labels for the objects are associated to images in advance. However, it is realistically difficult for the developer to prepare, in advance, the learning data for all possible objects that the autonomous mobile object 10 may encounter on a day-to-day basis, and to instruct the autonomous mobile object 10 to learn all of that learning data. Moreover, for example, even when pattern recognition learning for a large number of objects is performed in advance, if objects that never existed before become popular or objects having different designs than the existing objects become popular, then it becomes difficult to deal with such objects using only the already-learnt knowledge.

The technological thought according to the application concerned was conceived by focusing on the issue explained above, and it enables performing pattern recognition learning with more efficiency. In that regard, one of the features of the autonomous mobile object 10 according to the first embodiment of the application concerned is to automatically collect learning data based on the teaching and perform pattern recognition learning regarding objects; so that, even when the learning data has not been prepared in advance, the recognition ability with respect to various events is acquired.

For example, the autonomous mobile object 10 according to the first embodiment is capable of automatically collecting the learning data based on the teaching by the user. For example, the autonomous mobile object 10 can identify, as a learning target, an object indicated by the user by performing a gesture such as pointing with a finger, and can extract the label from the sound subsequently uttered by the user. Moreover, the autonomous mobile object 10 according to the first embodiment can automatically photograph the learning target that is to be learnt in a corresponding manner to the taught label.

As a result of being equipped with the functions explained above, the autonomous mobile object 10 according to the first embodiment can automatically generate learning data, which is related to pattern recognition learning of various events, based on the teaching; and can acquire the recognition ability with respect to events that may be newly observed on a day-to-day basis.

Given below is the detailed explanation of a configuration of the autonomous mobile object 10 having the abovementioned features. The autonomous mobile object 10 according to the first embodiment of the application concerned can be an autonomous mobile robot that autonomously moves in a space and performs various operations. For example, the autonomous mobile object 10 can be an autonomous mobile robot having the shape and the movement capability modeled on a person or an animal, such as a dog. Alternatively, for example, the autonomous mobile object 10 can be a vehicle or some other device having the ability to communicate with the user. Thus, regarding the autonomous mobile object 10 according to the first embodiment; the shape, the capability, and the requirements can be appropriately designed according to the objective and the role of the autonomous mobile object 10.

«1.2. Exemplary Hardware Configuration of Autonomous Mobile Object 10»

Given below is the explanation of an exemplary hardware configuration of the autonomous mobile object 10 according to the first embodiment of the application concerned. The following explanation is given for an example in which the autonomous mobile object 10 is a quadrupedal robot modeled on a dog.

FIG. 1 is a diagram illustrating an exemplary hardware configuration of the autonomous mobile object 10 according to the first embodiment of the application concerned. As illustrated in FIG. 1, the autonomous mobile object 10 is a dog-shaped quadrupedal robot having a head region, a torso region, four leg regions, and a tail region. Moreover, the autonomous mobile object 10 includes two displays 510 in the head region.

Furthermore, the autonomous mobile object 10 includes various sensors. For example, the autonomous mobile object 10 includes microphones 515, cameras 520, a ToF (Time of Flight) sensor 525, a human-presence sensor 530, ranging sensors 535, touch sensors 540, an illumination sensor 545, sole buttons 550, and inertia sensors 555.

(Microphones 515)

The microphones 515 have the function of collecting the surrounding sounds. Examples of the sounds include the speech of the user and the surrounding environmental sound. The autonomous mobile object 10 can include, for example, four microphones in the head region. As a result of having a plurality of microphones 515, the sounds generated in the surrounding area can be collected with high sensitivity, and the localization of the source of the sound can be performed.

(Cameras 520)

The cameras 520 have the function of photographing the user and the surrounding environment. For example, the autonomous mobile object 10 can include two wide-angle cameras, one at the tip of the nose and one in the loin region. In that case, the wide-angle camera installed at the tip of the nose photographs images corresponding to the anterior field of view of the autonomous mobile object (i.e., corresponding to the eyesight of a dog); and the wide-angle camera installed in the loin region photographs images of the surrounding area centered on the upward direction. For example, based on the images photographed by the wide-angle camera installed in the loin region, the autonomous mobile object 10 can extract the feature points of the ceiling and implement SLAM (Simultaneous Localization and Mapping).

(ToF Sensor 525)

The ToF sensor 525 has the function of detecting the distance to an object present in the anterior direction of the head region. The ToF sensor 525 is installed at the tip of the nose in the head region. As a result of using the ToF sensor 525, the distances to various objects can be detected with high accuracy, and the operations can be performed according to the relative positions with respect to the target objects, including the user, and obstacles.

(Human-Presence Sensor 530)

The human-presence sensor 530 has the function of detecting the whereabouts of the user or the pets of the user. The human-presence sensor 530 is installed in, for example, the chest region. As a result of using the human-presence sensor 530, any animal body present in the anterior direction can be detected and various operations with respect to that animal body can be performed, such as the operations according to the feelings including interest, fear, and astonishment can be performed.

(Ranging Sensors 535)

The ranging sensors 535 have the function of obtaining the condition of the floor in the anterior direction of the autonomous mobile object 10. For example, the ranging sensors 535 are installed in the chest region. As a result of using the ranging sensors 535, the distance to any object present on the floor in the anterior direction of the autonomous mobile object 10 can be detected with high accuracy, and the operations can be performed according to the relative position with respect to that object.

(Touch Sensors 540)

The touch sensors 540 have the function of detecting a touch by the user. For example, the touch sensors 540 are installed at the body parts that are highly likely to be touched by the user, such as the vertex of the head, the underside of the jaw, and the back of the autonomous mobile object 10. The touch sensors 540 can be, for example, touch sensors of the capacitive type or the pressure-sensitive type. As a result of using the touch sensors 540, touching actions such as touching, stroking, tapping, and pressing performed by the user can be detected, and the operations can be performed according to the touching actions.

(Illumination Sensor 545)

The illumination sensor 545 detects the illumination of the space in which the autonomous mobile object 10 is positioned. For example, the illumination sensor 545 can be installed at the base of the tail region on the backside of the head region. As a result of using the illumination sensor 545, the surrounding brightness can be detected, and the operations can be performed according to that brightness.

(Sole Buttons 550)

The sole buttons 550 have the function of detecting whether or not the undersurface of the leg portions of the autonomous mobile object 10 is touching the floor. For that reason, the sole buttons 550 are installed in the portions corresponding to the paw pads of the four legs. As a result of using the sole buttons 550, the contact or the non-contact between the autonomous mobile object 10 and the floor surface can be detected; and, for example, it can be understood that the autonomous mobile object 10 has been lifted up by the user.

(Inertia Sensors 555)

The inertia sensors 555 are 6-axis sensors for detecting the physical quantities such as the velocity, the acceleration, and the rotation of the head region or the torso region. That is, the inertia sensors 555 detect the acceleration and the angular velocity of the X-axis, the Y-axis, and the Z-axis. The inertia sensors 555 are installed in the head region and the torso region. As a result of using the inertia sensors 555, the movements of the head region and the torso region of the autonomous mobile object 10 can be detected with high accuracy, and operation control can be performed according to the situation.

Till now, the explanation was given about an example of the sensors installed in the autonomous mobile object 10 according to the first embodiment of the application concerned. Meanwhile, the configuration explained with reference to FIG. 1 is only exemplary, and the configuration of the sensors includible in the autonomous mobile object 10 is not limited to this example. In addition to the configuration explained above, the autonomous mobile object 10 can further include a temperature sensor, a geomagnetic sensor, and various communication devices including a GNSS (Global Navigation Satellite System) signal receiver. Thus, the configuration of the sensors installed in the autonomous mobile object 10 can be flexibly modified according to the specifications and the operations.

Figure 2:
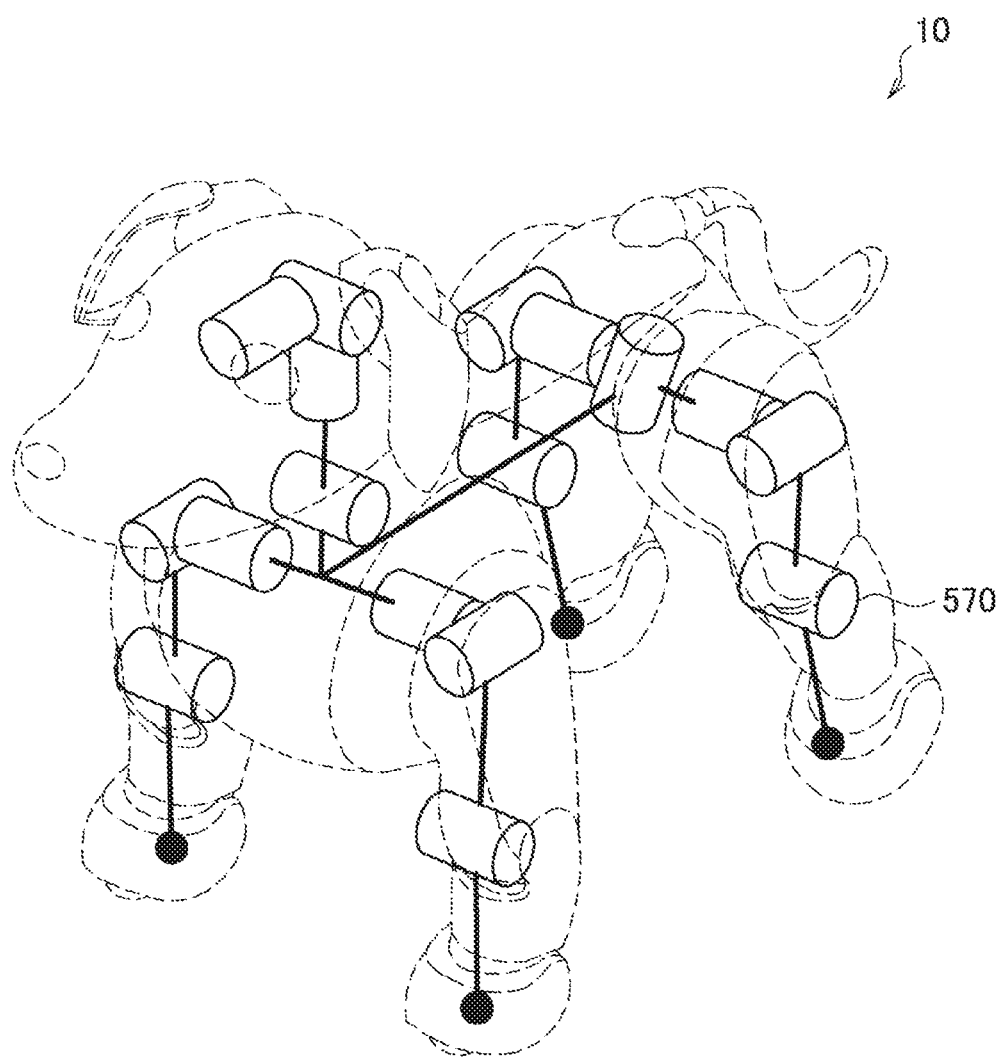
FIG. 2 is an exemplary configuration of actuators installed in the autonomous mobile object according to the first embodiment.

Given below is the explanation of an exemplary configuration of the joint regions of the autonomous mobile object 10 according to the embodiment. FIG. 2 is an exemplary configuration of actuators 570 installed in the autonomous mobile object 10 according to the first embodiment of the application concerned. The autonomous mobile object 10 according to the first embodiment of the application concerned has a total of 22 rotational degrees of freedom that, in addition to including rotating parts illustrated in FIG. 2, include two rotational degrees of freedom in the ear regions, two rotational degrees of freedom in the tail region, and one rotational degree of freedom on the mouth.

For example, as a result of having three rotational degrees of freedom in the head region, the autonomous mobile object 10 can perform nodding as well as tilting the head to the sides. Moreover, as a result of having the actuator 570 installed in the loin region, the autonomous mobile object 10 can reproduce the swinging action of the loin. That enables achieving natural and flexible actions that are more similar to a real-life dog. Meanwhile, in the autonomous mobile object 10 according to the embodiment of the application concerned, for example, the 22 rotational degrees of freedom can be implemented using a combination of single-axis actuators and two-axis actuators. For example, one-axis actuators can be used in the elbow portions and the knee portions of the leg regions, and two-axis actuators can be used in the base of the shoulders and the thighs.

Figure 3:
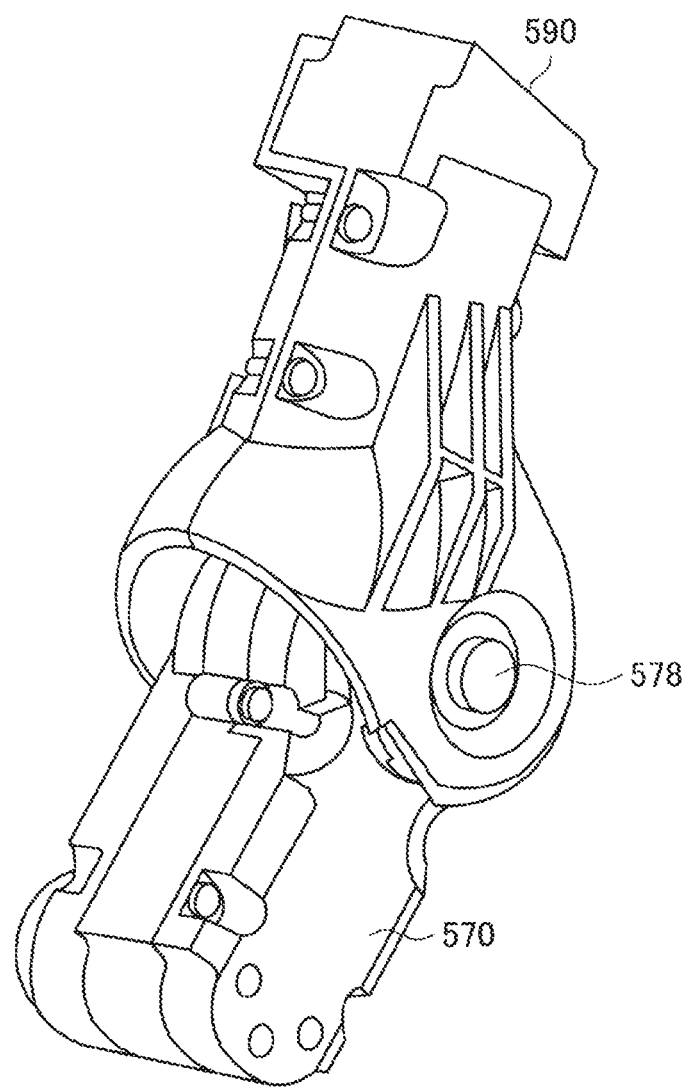
FIG. 3 is a diagram for explaining about the operations of the actuators installed in the autonomous mobile object according to the first embodiment.
Figure 4:
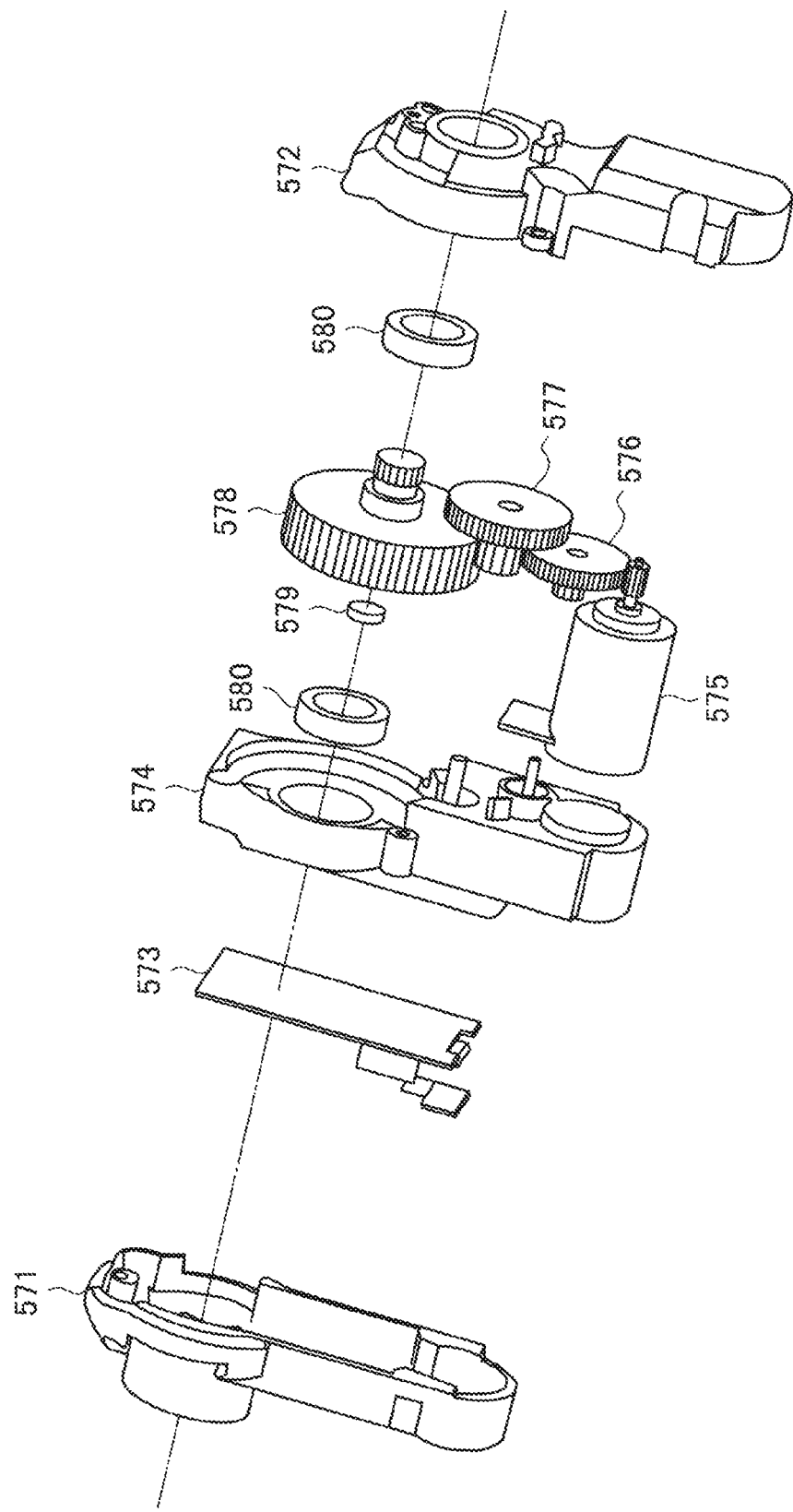
FIG. 4 is a diagram for explaining about the operations of the actuators installed in the autonomous mobile object according to the first embodiment.

FIGS. 3 and 4 are diagrams for explaining about the operations of the actuators 570 installed in the autonomous mobile object 10 according to the first embodiment of the application concerned. With reference to FIG. 3, in each actuator 570, as a result of rotating an output gear using a motor 575, a movable arm 590 can be driven at an arbitrary rotational position and an arbitrary rotating speed.

With reference to FIG. 4, the actuator 570 according to the first embodiment of the application concerned includes a rear cover 571, a gearbox cover 572, a control board 573, a gearbox base 574, the motor 575, a first gear 576, a second gear 577, an output gear 578, a detection magnet 579, and two bearings 580.

The actuators 570 according to the first embodiment of the application concerned can be, for example, magnetic svGMR (spin-valve Giant Magnetoresistive). The control board 573 rotates the motor 575 under the control of a main processor, so that the power can be transmitted to the output gear 578 via the first gear 576 and the second gear 577, and the movable arm 590 can be driven.

Moreover, a position sensor installed in the control board 573 detects the angle of rotation of the detection magnet 579 that rotates in synchronization with the output gear 578; so that the angle of rotation of the movable arm 590, that is, the rotational position of the movable arm 590 can be detected with high accuracy.

Meanwhile, magnetic svGMR has excellent durability on account of being non-contactless in nature; and, as a result of being used in the GMR saturation area, is less affected by signal fluctuation attributed to the variation in the distance to the detection magnet 579 or the position sensor.

Till now, the explanation was given about an exemplary configuration of the actuator 570 installed in the autonomous mobile object 10 according to the first embodiment of the application concerned. With such a configuration, the bending action of the joint regions of the autonomous mobile object 10 can be controlled with high accuracy, and the rotational positions of the joint regions can be accurately detected.

Figure 5:
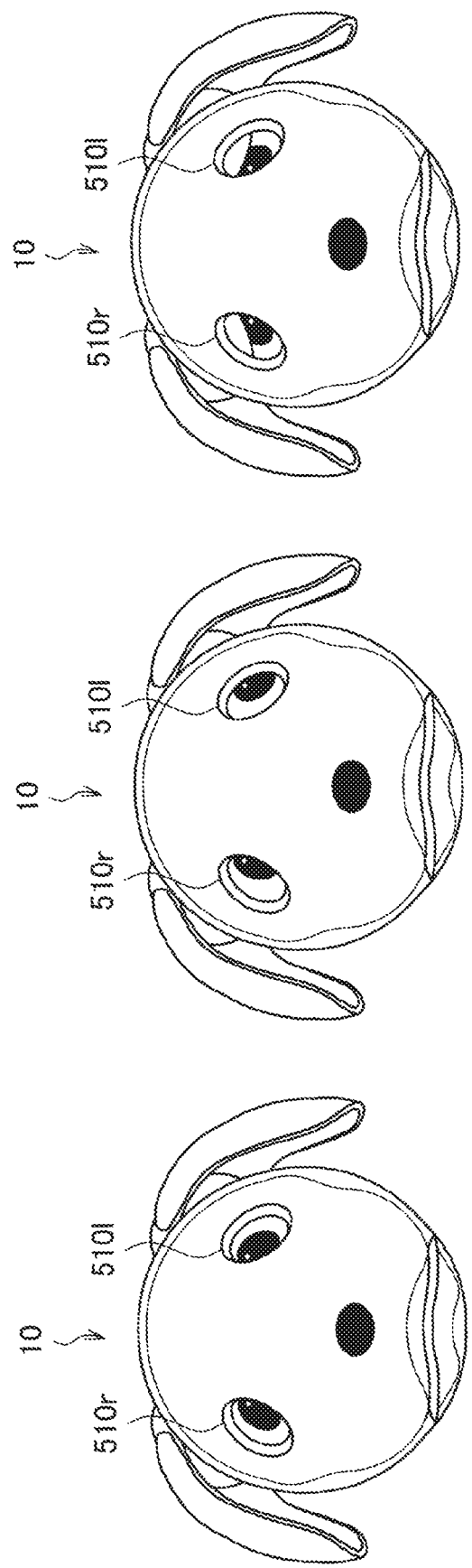
FIG. 5 is a diagram for explaining about the functions of displays that are installed in the autonomous mobile object according to the first embodiment.

Explained below with reference to FIG. 5 are the functions of the displays 510 that are installed in the autonomous mobile object 10 according to the first embodiment of the application concerned. FIG. 5 is a diagram for explaining about the functions of the displays 510 that are installed in the autonomous mobile object 10 according to the first embodiment of the application concerned.

(Displays 510)

The displays 510 have the function of visually expressing the eye movement and the feelings of the autonomous mobile object 10. As illustrated in FIG. 5, the displays 510 can express the movements of the eyeballs, the pupils, and the eyelids according to feelings and actions. Moreover, it is ensured that images of characters and symbols not related to the ocular movements are not displayed in the displays 510, so as to create natural actions that are similar to a real-life animal such as a dog.

As illustrated in FIG. 5, the autonomous mobile object 10 includes two displays, namely, a display 510*r* corresponding to the right eye and a display 510*l* corresponding to the left eye. The displays 510*r* and 510*l* are implemented using, for example, two independent OLEDs (Organic Light Emitting Diodes). As a result of using OLEDs, the curved surface of the eyeballs can be reproduced, and hence a more natural exterior look can be achieved as compared to the case in which the pair of eyeballs is expressed using a single flat display or the case in which the two eyeballs are expressed using two independent flat displays.

As explained above, as a result of using the displays 510*r* and 510*l*, the glances and the feelings of the autonomous mobile object 10 as illustrated in FIG. 5 can be expressed with high accuracy and in a flexible manner. Moreover, from the actions of the eyeballs displayed in the displays 510, the user becomes able to intuitively understand the state of the autonomous mobile object 10.

Figure 6:
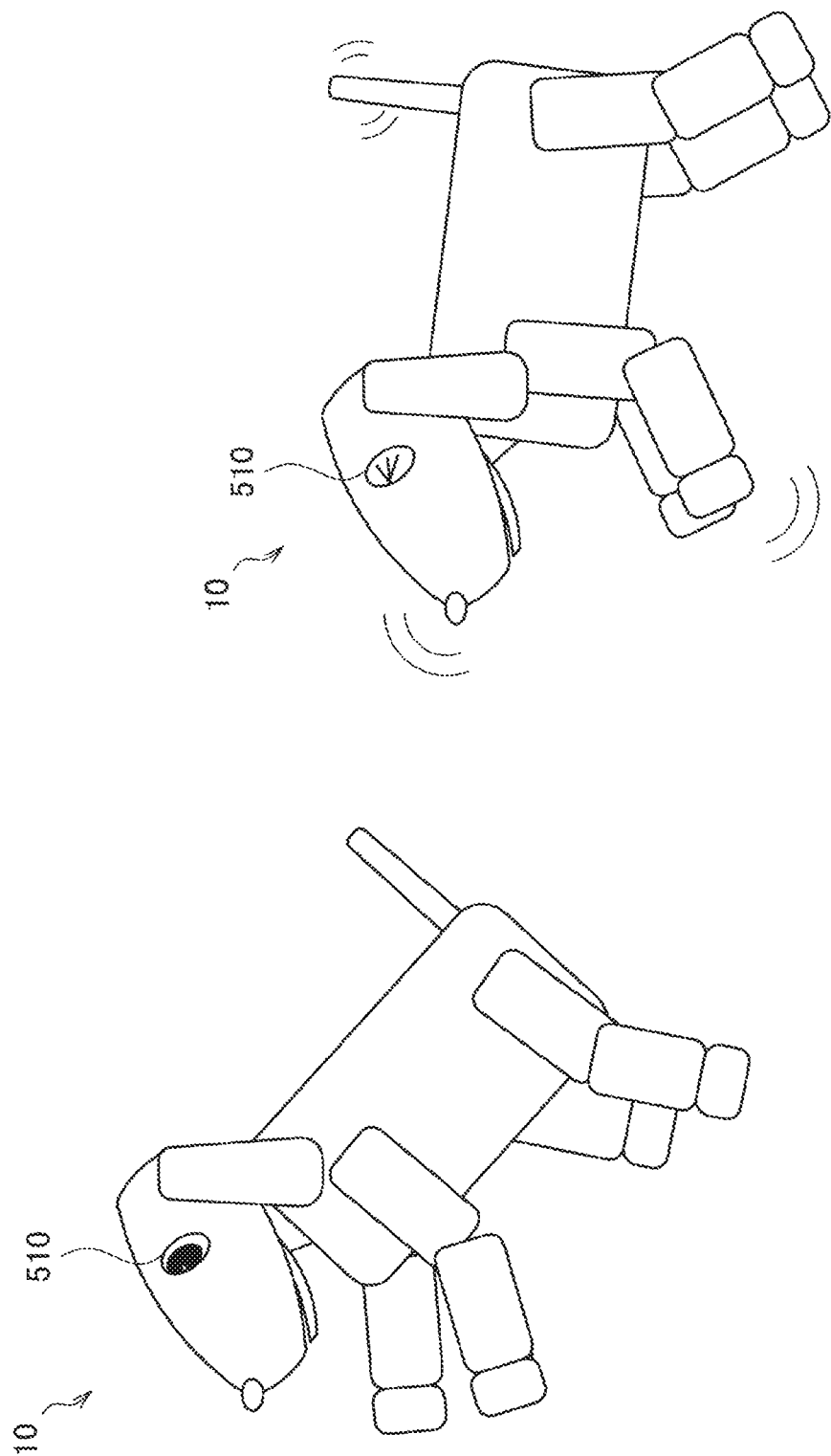
FIG. 6 is a diagram illustrating exemplary actions of the autonomous mobile object according to the first embodiment.

Till now, the explanation was given about an exemplary hardware configuration of the autonomous mobile object 10 according to the first embodiment of the application concerned. With such a hardware configuration, as illustrated in FIG. 6, the actions of the joint regions and the eyeballs of the autonomous mobile object 10 are controllable with high accuracy and flexibility, and hence actions and emotional expressions close to a real-life living object can be achieved. FIG. 6 is a diagram illustrating exemplary actions of the autonomous mobile object 10 according to the first embodiment of the application concerned. With reference to FIG. 6, the explanation is given with the focus on the actions of the joint regions and the eyeballs of the autonomous mobile object 10. For that reason, the outside structure of the autonomous mobile object 10 is illustrated in a simplified form. In an identical manner, in the following explanation too, the outside structure of the autonomous mobile object 10 is sometimes illustrated in a simplified form. However, the hardware configuration and the exterior look of the autonomous mobile object 10 according to the first embodiment of the application concerned is not limited to the examples illustrated in the drawings, and can be designed as deemed appropriate.

«1.2. Exemplary Hardware Configuration of Autonomous Mobile Object 10»

Figure 7:
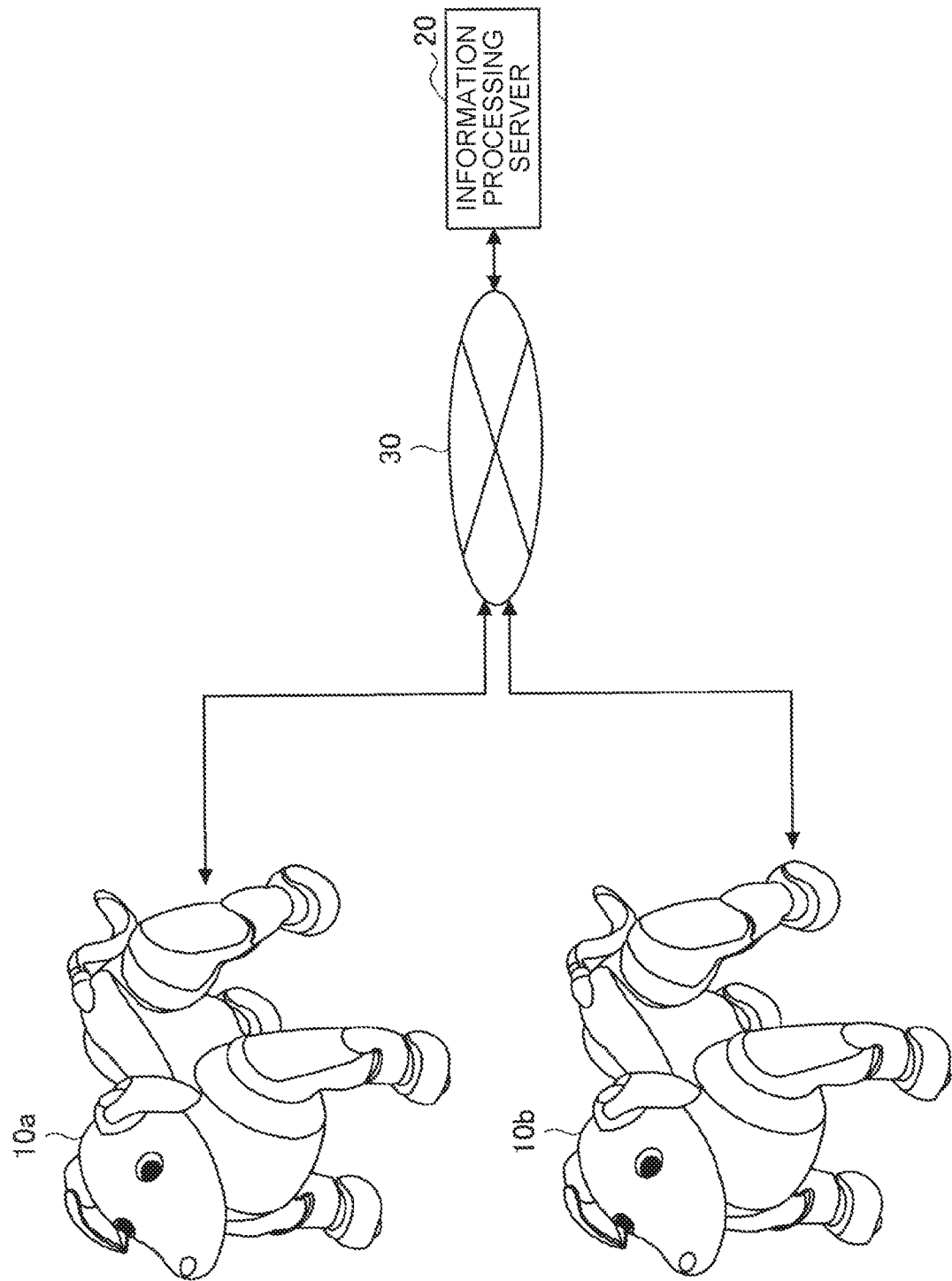
FIG. 7 is a diagram illustrating an exemplary system configuration according to the first embodiment.

Given below is the explanation of an exemplary system configuration according to the first embodiment of the application concerned. FIG. 7 is a diagram illustrating an exemplary system configuration according to the first embodiment of the application concerned. With reference to FIG. 7, an information processing system according to the first embodiment of the application concerned includes a plurality of autonomous mobile objects 10 and an information processing server 20. The autonomous mobile objects 10 are connected to the information processing server 20 as well as connected to each other in a mutually communicable manner via a network 30.

(Autonomous Mobile Object 10)

The autonomous mobile object 10 according to the first embodiment of the application concerned is an information processing device that performs situation estimation based on the collected sensor information, and autonomously selects and performs various operations depending on the situation. As explained above, the autonomous mobile object 10 according to the first embodiment of the application concerned can be an autonomous mobile robot having the shape and the movement capability modeled on a person or an animal such as a dog. Moreover, the autonomous mobile object 10 according to the first embodiment of the application concerned can automatically collect learning data based on the teaching, and can perform pattern recognition learning based on the learning data.

(Information Processing Server 20)

The information processing server 20 according to the first embodiment of the application concerned is an information processing device that is connected to a plurality of autonomous mobile objects 10 and that has the function of collecting a variety of information from the autonomous mobile objects 10. For example, the information processing server 20 stores the learning data collected by a plurality of autonomous mobile objects 10. Moreover, the information processing server 20 according to the first embodiment of the application concerned controls an user interface that enables a user to confirm the learning status of the corresponding autonomous mobile object 10.

(Network 30)

The network 30 has the function of connecting the autonomous mobile objects 10 to the information processing server 20 and to each other. The network 30 can include a public line network such as the Internet, a telephone line network, or a satellite communication network; various types of LANs (Local Area Networks) such as Ethernet (registered trademark); and a WAN (Wide Area Network). Alternatively, the network 30 can include a dedicated line network such as an IP-VPN (Internet Protocol-Virtual Private Network). Still alternatively, the network 30 can include a wireless communication network such as Wi-Fi (registered trademark) or Bluetooth (registered trademark).

Till now, the explanation was given about an exemplary system configuration according to the first embodiment of the application concerned. However, the configuration explained above with reference to FIG. 7 is only exemplary, and the configuration of the information processing system according to the first embodiment of the application concerned is not limited to that example. Alternatively, for example, in addition to communicating information with the information processing server 20, the autonomous mobile objects 10 can communicate information with various external devices too. Examples of the external devices include a server that offers weather information, news, and other service information; various information processing terminals held by the users; and electrical home appliances. Thus, the system configuration according to the first embodiment of the application concerned can be flexibly modified according to the specifications and the operations.

«1.4. Exemplary Functional Configuration of Autonomous Mobile Object 10»

Figure 8:
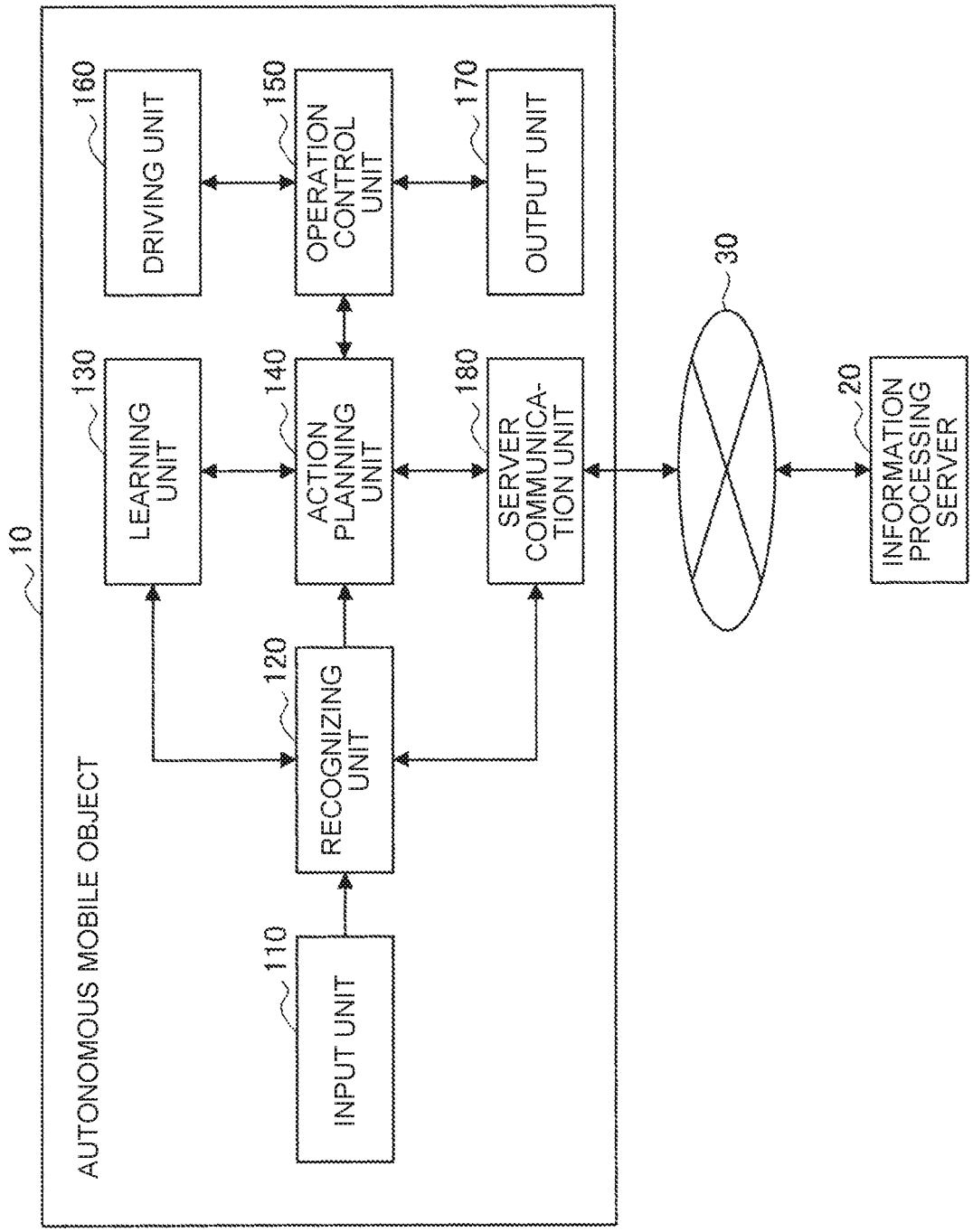
FIG. 8 is a diagram illustrating an exemplary functional configuration of the autonomous mobile object according to the first embodiment.

Given below is the explanation of an exemplary functional configuration of the autonomous mobile object 10 according to the first embodiment of the application concerned. FIG. 8 is a diagram illustrating an exemplary functional configuration of the autonomous mobile object 10 according to the first embodiment of the application concerned. With reference to FIG. 8, the autonomous mobile object 10 according to the first embodiment of the application concerned includes an input unit 110, a recognizing unit 120, a learning unit 130, an action planning unit 140, an operation control unit 150, a driving unit 160, an output unit 170, and a server communication unit 180.

(Input Unit 110)

The input unit 110 has the function of collecting a variety of information related to the user and the surrounding environment. For example, the input unit 110 collects the speech of the user and the surrounding environmental sound, collects image information related to the user and the surrounding environment, and collects a variety of sensor information. For that reason, the input unit 110 includes the various sensors illustrated in FIG. 1.

(Recognizing Unit 120)

The recognizing unit 120 has the function of performing, based on the variety of information collected by the input unit 110, a variety of recognition related to the user, the surrounding environment, and the state of the autonomous mobile object 10. As an example, the recognizing unit 120 can perform person identification, identification of expressions and glances, object recognition, movement recognition, space region recognition, color recognition, shape recognition, marker recognition, obstacle recognition, level difference recognition, and brightness recognition.

For example, the recognizing unit 120 according to the first embodiment of the application concerned can have the function of identifying a learning target that is indicated by the user by performing a gesture such as pointing with a finger. Moreover, for example, the recognizing unit 120 according to the first embodiment of the application concerned can have the function of performing morphological analysis of the sound uttered by the user after performing the abovementioned gesture and extract a noun phrase. The noun phrase is usable as a label in the pattern recognition learning performed by the learning unit 130.

Moreover, the recognizing unit 120 performs emotion recognition, word comprehension, and sound source localization in regard to the voice of the user. Furthermore, the recognizing unit 120 can recognize a touch by the user, the surrounding temperature, the presence of an animal body, and the posture of the autonomous mobile object 10.

Moreover, the recognizing unit 120 has the function of estimating and comprehending, based on the abovementioned recognized information, the surrounding environment and the situation in which the autonomous mobile object 10 is present. At that time, the recognizing unit 120 can perform comprehensive situation estimation using the environment knowledge stored in advance.

(Learning Unit 130)

The learning unit 130 has the function of learning the environment (situation), learning the actions, and learning the effects of the actions on the environment. The learning unit 130 performs the abovementioned learning using, for example, a machine learning algorithm such as deep learning. However, the learning algorithm implemented by the learning unit 130 is not limited to that example, and it can be designed as deemed appropriate.

The learning unit 130 according to the first embodiment performs pattern recognition learning based on a label collected by the recognizing unit 120 according to the teaching and based on the images of a learning target as photographed by the input unit 110.

(Action Planning Unit 140)

The action planning unit 140 has the function of planning the actions of the autonomous mobile object 10 based on the situation estimated by the recognizing unit 120 and based on the knowledge learnt by the learning unit 130.

(Operation Control Unit 150)

The operation control unit 150 has the function of controlling the operations of the driving unit 160 and the output unit 170 based on the action planning performed by the action planning unit 140. For example, based on the action planning, the operation control unit 150 performs rotation control of the actuators 570, the display control of the displays 510, and the sound output control of speakers.

For example, based on the fact that the recognizing unit 120 has detected the start of teaching related to pattern recognition learning, the operation control unit 150 according to the first embodiment can instructs the input unit 110 to obtain information related to the learning target to be learnt in a corresponding manner to the taught label.

More particularly, the operation control unit 150 according to the first embodiment controls the driving unit 160 in such a way that a learning target identified by the recognizing unit 120 is in a photographable position and posture, and instructs the input unit 110 to photograph the learning target.

At that time, the operation control unit 150 according to the first embodiment can control the driving unit 160 so as to vary the position and the posture of the autonomous mobile object 10, and instruct the input unit 110 to photograph the learning target from a plurality of angles. Because of the functions of the operation control unit 150 according to the first embodiment, for example, images of a plurality of lateral faces and the top face of the learning target can be collected and treated as the learning data, and pattern recognition learning can be performed with more efficiency. Regarding the functions of the operation control unit 150 according to the first embodiment, the detailed explanation is given later separately.

(Driving Unit 160)

The driving unit 160 has the function of bending a plurality of joint regions of the autonomous mobile object 10 under the control of the operation control unit 150. More particularly, under the control of the operation control unit 150, the driving unit 160 drives the actuators 570 installed in the joint regions.

(Output Unit 170)

The output unit 170 has the function of outputting visual information and audio information under the control of the operation control unit 150. For that purpose, the output unit 170 includes the displays 510 and speakers.

(Server Communication Unit 180)

The server communication unit 180 has the function of communicating information with the information processing server 20 and the other autonomous mobile objects 10. For example, the server communication unit 180 sends the collected learning data to the information processing server 20. Moreover, for example, the server communication unit 180 receives the learning data stored in the information processing server 20, and receives information related to the learnt knowledge acquired based on the learning data.

Till now, the explanation was given about an exemplary functional configuration of the autonomous mobile object 10 according to the first embodiment of the application concerned. However, the configuration explained with reference to FIG. 8 is only exemplary, and the functional configuration of the autonomous mobile object 10 according to the first embodiment of the application concerned is not limited to that example. Thus, the functional configuration of the autonomous mobile object 10 according to the first embodiment of the application concerned can be flexibly modified according to the specifications and the operations.

«1.5. Exemplary Functional Configuration of Information Processing Server 20»

Figure 9:
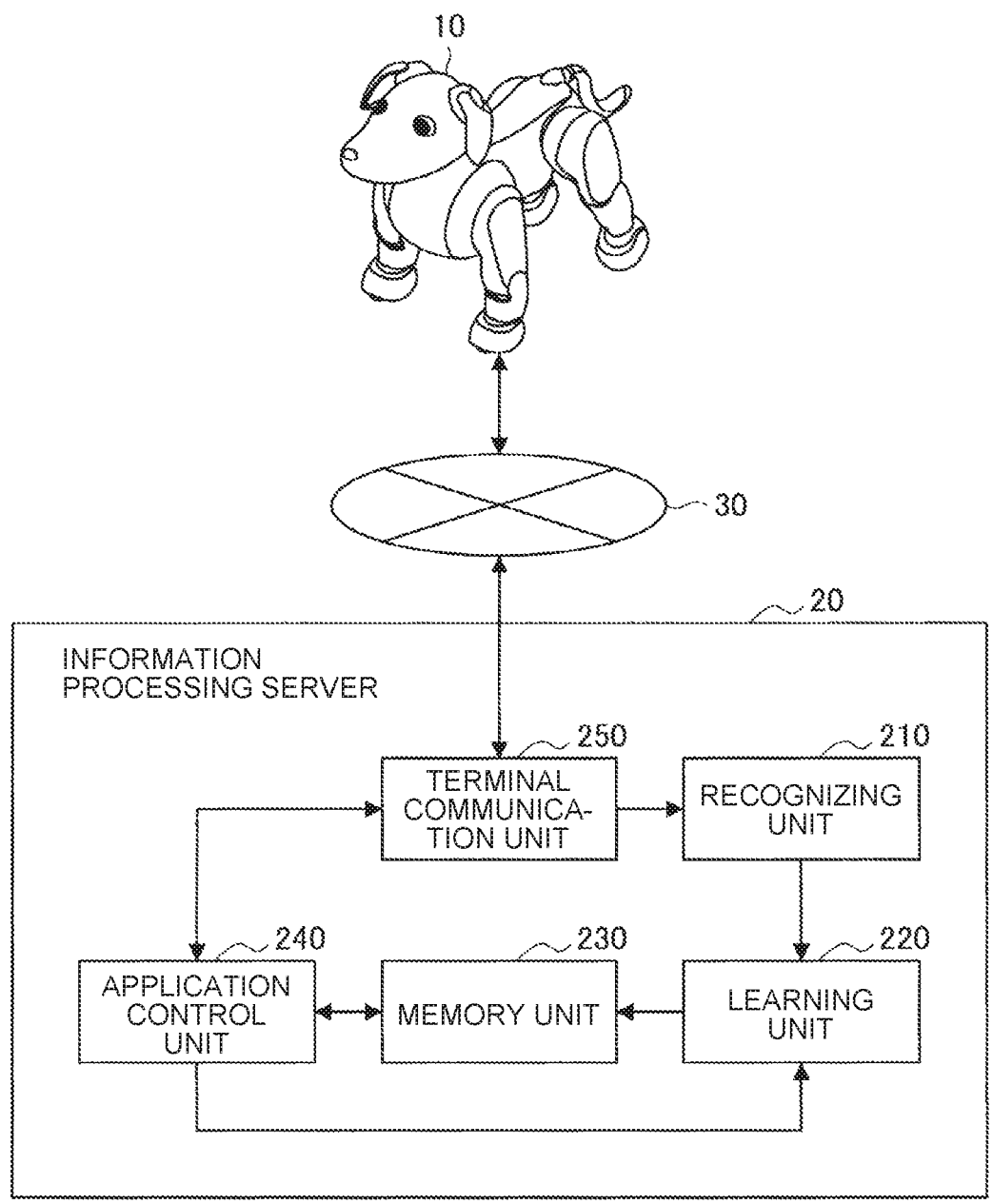
FIG. 9 is a diagram illustrating an exemplary functional configuration of an information processing server according to the first embodiment.

Given below is the explanation of an exemplary functional configuration of the information processing server 20 according to the first embodiment of the application concerned. FIG. 9 is a diagram illustrating an exemplary functional configuration of the information processing server 20 according to the first embodiment of the application concerned. With reference to FIG. 9, the information processing server 20 according to the first embodiment of the application concerned includes a recognizing unit 210, a learning unit 220, a memory unit 230, an application control unit 240, and a terminal communication unit 250.

(Recognizing Unit 210)

The recognizing unit 210 according to the first embodiment can have an equivalent function to the function of the recognizing unit 210 of the autonomous mobile object 10. That is, the recognizing unit 210 according to the first embodiment has the function of identifying a learning target and extracting a label based on the teaching. Meanwhile, the recognizing unit 210 according to the first embodiment can identify a learning target and extract a label based on the information collected by a plurality of autonomous mobile objects 10.

(Learning Unit 220)

The learning unit 220 according to the first embodiment can have an equivalent function to the function of the learning unit 130 of the autonomous mobile object 10. That is, the learning unit 220 according to the first embodiment performs pattern recognition learning based on a label obtained by the learning unit 220 and an image related to a learning target. Meanwhile, the learning unit 220 according to the first embodiment can perform pattern recognition learning based on the information collected by a plurality of autonomous mobile objects. That is, the learning unit 220 according to the first embodiment functions as the collective wisdom common to a plurality of autonomous mobile objects 10.

(Memory Unit 230)

The memory unit 230 according to the first embodiment is used to store the collected learning data, the learnt knowledge acquired by the learning unit 220 and the autonomous mobile objects 10, and the result of pattern recognition performed based on the learnt knowledge.

(Application Control Unit 240)

The application control unit 240 according to the first embodiment controls a user interface related to the state confirmation and the function control of the autonomous mobile objects 10. The application control unit 240 can display the user interface in the information processing terminal possessed by a user. In the user interface, for example, the application control unit 240 provides a way for confirming the learning status of the corresponding autonomous mobile object 10 and a way for associating a label related to pattern recognition learning to a learning target.

Particularly, the application control unit 240 according to the first embodiment can provide a way for enabling a user to correct the association between a label learnt by the corresponding autonomous mobile object 10 and a learning target. Regarding the functions of the application control unit 240 according to the present embodiment, the detailed explanation is given later separately. Meanwhile, the functions of the application control unit 240 according to the present embodiment can alternatively be implemented as the functions of the autonomous mobile object 10. That is, the autonomous mobile object 10 according to the first embodiment can separately include an application control unit in addition to having the configuration illustrated in FIG. 8.

(Terminal Communication Unit 250)

The terminal communication unit 250 according to the first embodiment communicates information with a plurality of autonomous mobile objects 10 via the network 30. For example, the terminal communication unit 250 according to the first embodiment receives the learning data and the pattern recognition result from the autonomous mobile objects 10. Moreover, the terminal communication unit 250 sends, to each autonomous mobile object 10, the learning data collected by a plurality of autonomous mobile objects 10 and the learnt knowledge acquired based on the learning data.

Till now, the explanation was given about an exemplary functional configuration of the information processing server 20 according to the first embodiment of the application concerned. However, the configuration explained with reference to FIG. 9 is only exemplary, and the functional configuration of the information processing server 20 according to the first embodiment is not limited to that example. For example, as explained earlier, the information processing server 20 according to the first embodiment can have an equivalent function to the function of the action planning unit 140 or the operation control unit 150 of the autonomous mobile object 10. In that case, the information processing server 20 according to the first embodiment can perform situation estimation based on the sensor information collected by the input unit 110 of the autonomous mobile object 10, and can remote-control the driving unit 160 and the output unit 170. Thus, the functional configuration of the information processing server 20 according to the first embodiment can be flexibly modified according to the specifications and the operations.

«1.6. Details of Functions»

Given below is the detailed explanation of the functions of the autonomous mobile object 10 and the information processing server 20 according to the first embodiment of the application concerned. In the following explanation, the explanation is given mainly for the example in which the pattern recognition learning is performed by the learning unit 130 of the autonomous mobile object 10. However, alternatively, the pattern recognition learning can be performed by the learning unit 220 of the information processing server 20 as explained earlier, or can be performed by the learning unit 130 as well as the learning unit 220.

Figure 10:
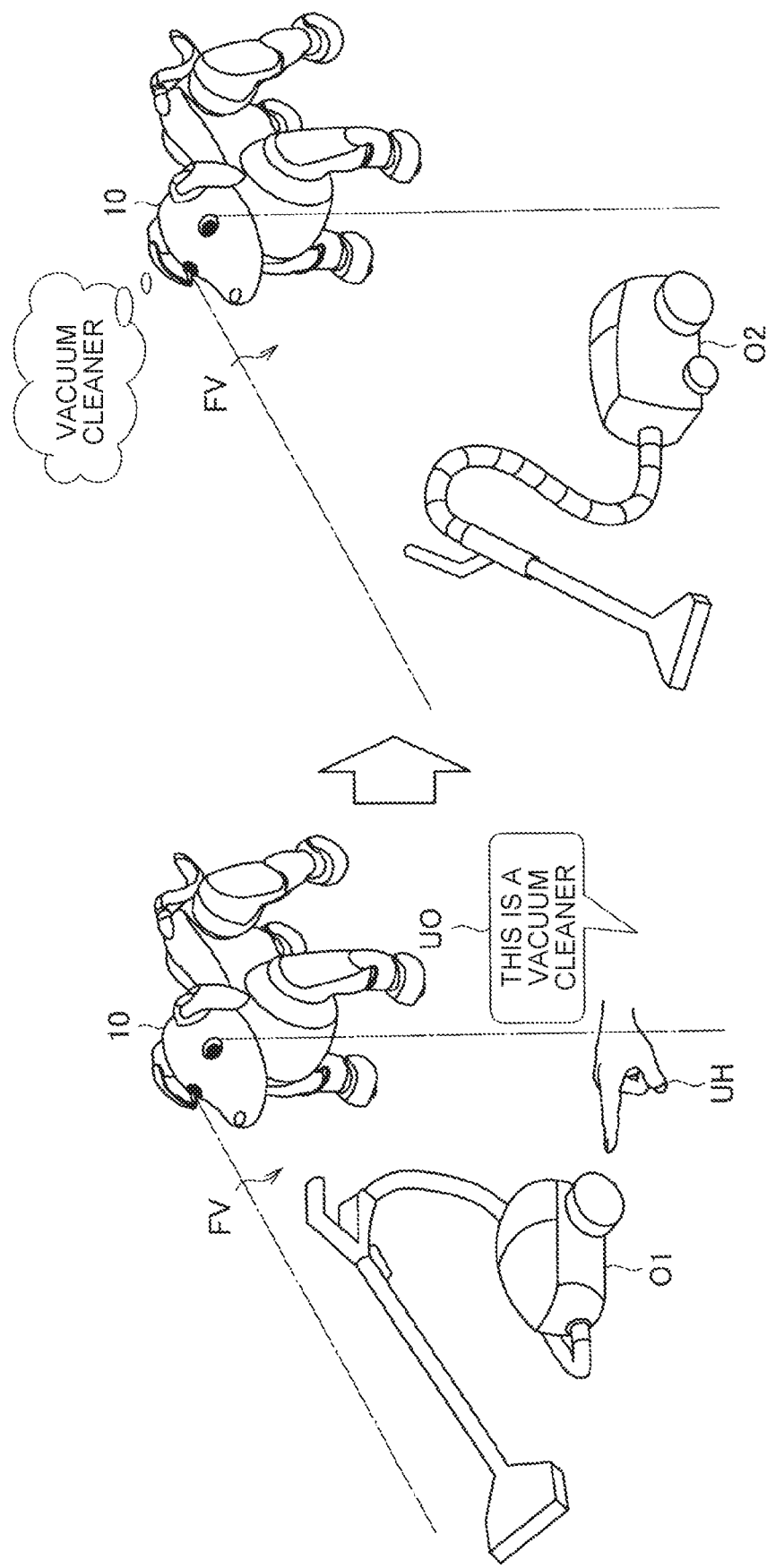
FIG. 10 is a diagram illustrating the overview of pattern recognition learning performed based on teaching according to the first embodiment.

Firstly, the explanation is given about the overview of the pattern recognition learning performed based on the teaching according to the first embodiment. FIG. 10 is a diagram illustrating the overview of the pattern recognition learning performed based on the teaching according to the first embodiment. In FIG. 10 is illustrated an example in which the teaching according to the first embodiment is performed by the user.

For example, as illustrated in the left-hand side in FIG. 10, the teaching according to the first embodiment can be performed by the user using a gesture, such as pointing with a finger, and using speech. In the example illustrated in FIG. 10, the user indicates an object O1 representing a "vacuum cleaner" using a finger UH, and teaches the autonomous mobile object 10 that the object O1 is a "vacuum cleaner" using speech UO.

At that time, firstly, based on a user speech such as "remember it", or based on a user gesture of indicating the start of learning based on the teaching, or based on the sound of finger snapping; the recognizing unit 120 according to the first embodiment detects the start of the teaching. Moreover, at that time, the operation control unit 150 according to the first embodiment can instruct the autonomous mobile object 10 to perform an action of indicating the start of learning based on the teaching. For example, the operation control unit 150 can instruct the autonomous mobile object 10 to bark or pick up the ears or the tail, or change the color of the irises expressed using the displays 510. In the case in which the autonomous mobile object 10 communicates with the user by using language, the operation control unit 150 can instruct the output unit 170 to output a sound indicating the start of learning.

Then, the operation control unit 150 controls the driving unit 160 and varies the position and the posture of the autonomous mobile object 10 in such a way that the object O1 indicated by the finger UF and the finger UF of the user fits within a field of view FV.

Subsequently, the recognizing unit 120 identifies the object O1 as the learning target based on the direction indicated by the finger UF of the user. Moreover, the operation control unit 150 according to the first embodiment instructs the input unit 110 to photograph the object O1 that is identified as the learning target by the recognizing unit 120.

Furthermore, the recognizing unit 120 performs morphological analysis of the speech UO of the user, and extracts a noun phrase "vacuum cleaner" used as the label.

Then, the learning unit 130 associates the extracted label to the photographed image of the learning target, treats the label and the image as the learning data, and performs object recognition learning regarding the object O1.

In this way, in the autonomous mobile object 10 according to the first embodiment, even if the learning data is not prepared in advance, the learning data regarding various objects encountered on a day-to-day basis can be automatically collected, and object recognition learning can be performed based on the collected learning data.

Moreover, as a result of the functions of the autonomous mobile object 10 according to the first embodiment, the learning based on the teaching is performed in a repeated manner, and the collective wisdom acquired by the information processing server 20 is used so that, as illustrated in the right-hand side in FIG. 10, an object O2 having a different shape (feature) than the object O1 can also be recognized as a "vacuum cleaner". As a result, for example, even when the user trades up for a new "vacuum cleaner", the situation can be flexibly handled without having to relearn from the scratch.

Till now, the explanation was given about the overview of pattern recognition learning performed based on the teaching according to the first embodiment. With reference to FIG. 10, although the explanation is given about object recognition learning as an example of the pattern recognition learning according to the first embodiment, the pattern recognition learning according to the first embodiment is not limited to that example. In the pattern recognition learning according to the first embodiment, for example, action recognition learning is included. That is, an action of an object can represent the learning target according to the first embodiment.

Figure 11:
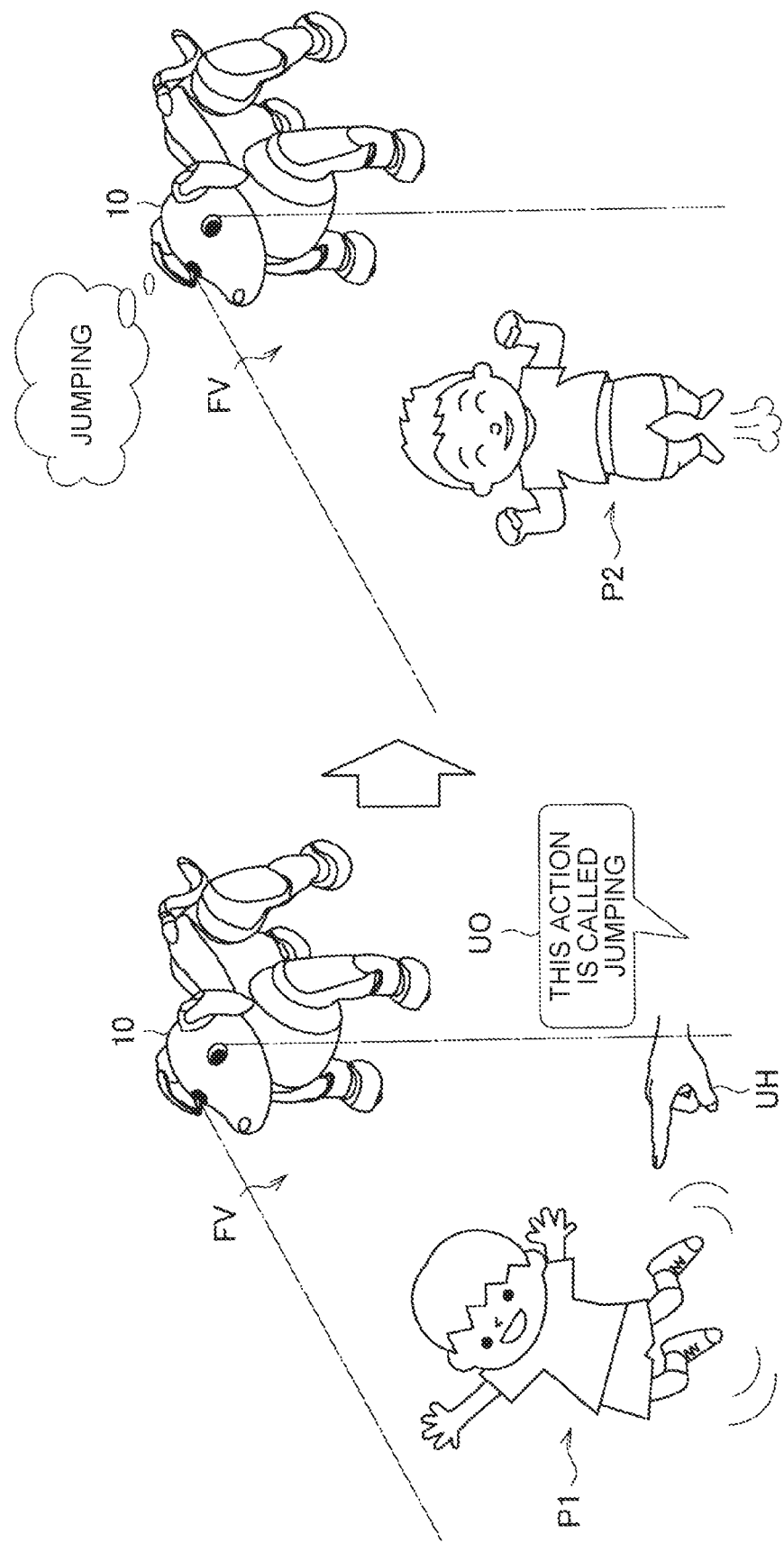
FIG. 11 is a diagram illustrating the overview of action recognition learning performed based on the teaching according to the first embodiment.

FIG. 11 is a diagram illustrating the overview of the action recognition learning performed based on the teaching according to the first embodiment. In the example illustrated in FIG. 11, the user teaches the autonomous mobile object 10 about a "jumping" action performed by a person.

More particularly, as illustrated in the left-hand side in FIG. 11, the user is using the finger UH to indicate a person P1 who is "jumping", and is using the speech UO to teach that the action being performed by the person P1 is "jumping".

At that time, the recognizing unit 120 according to the first embodiment can recognize the phrase "action" included in the speech UO, and can detect that the user is not teaching about object recognition (or user recognition) in regard to the person P1, but is teaching about the action being performed by the person P1. Moreover, based on the speech such as "remember the action" uttered by the user, the recognizing unit 120 can detect that the teaching is about action recognition.

Then, based on the direction indicated by the finger UF of the user, the recognizing unit 120 identifies the action performed by the person P1 as the learning target. Moreover, the operation control unit 150 according to the first embodiment instructs the input unit 110 to photograph the action of the person P1 that is identified as the learning target by the recognizing unit 120.

Furthermore, the recognizing unit 120 performs morphological analysis of the speech UO of the user, and extracts the phrase "jumping" used as the label.

Then, the learning unit 130 associates the extracted label to the photographed image of the learning target, treats the label and the image as the learning data, and performs object recognition learning regarding the action performed by the person P1.

In this way, in the autonomous mobile object 10 according to the first embodiment, the learning data related to not only an object but also about various actions performed by that object can be automatically collected, and object recognition learning based on that learning data can be performed.

In the example explained above, an image of an action is used as the learning data. Alternatively, for example, the learning unit 130 according to the first embodiment can use, as the learning data, motion data that is collected by an information processing terminal worn by the person who is performing an action.

As a result of the abovementioned function of the autonomous mobile object 10 according to the first embodiment, the learning based on the teaching is performed in a repeated manner, and the collective wisdom acquired by the information processing server 20 is used so that, as illustrated in the right-hand side in FIG. 11, the action of "jumping" performed by a person P2 who is different than the person P1 can also be recognized with high accuracy.

Meanwhile, the pattern recognition learning according to the first embodiment can also include, for example, space region recognition learning. That is, an arbitrary space region can represent the learning target according to the first embodiment. According to the first embodiment, a space region can be an arbitrary predetermined region (area) in the space. Moreover, according to the first embodiment, a space region need not necessarily be an enclosed region that is physically separated from other space regions. For example, according to the first embodiment, a "house" can represent a space region or the "first floor" of a "house" can represent a space region. Moreover, according to the first embodiment, the "living room" on the "first floor" can represent a space region, or the "area near the sofa" in the "living room" can represent a space region.

Figure 12:
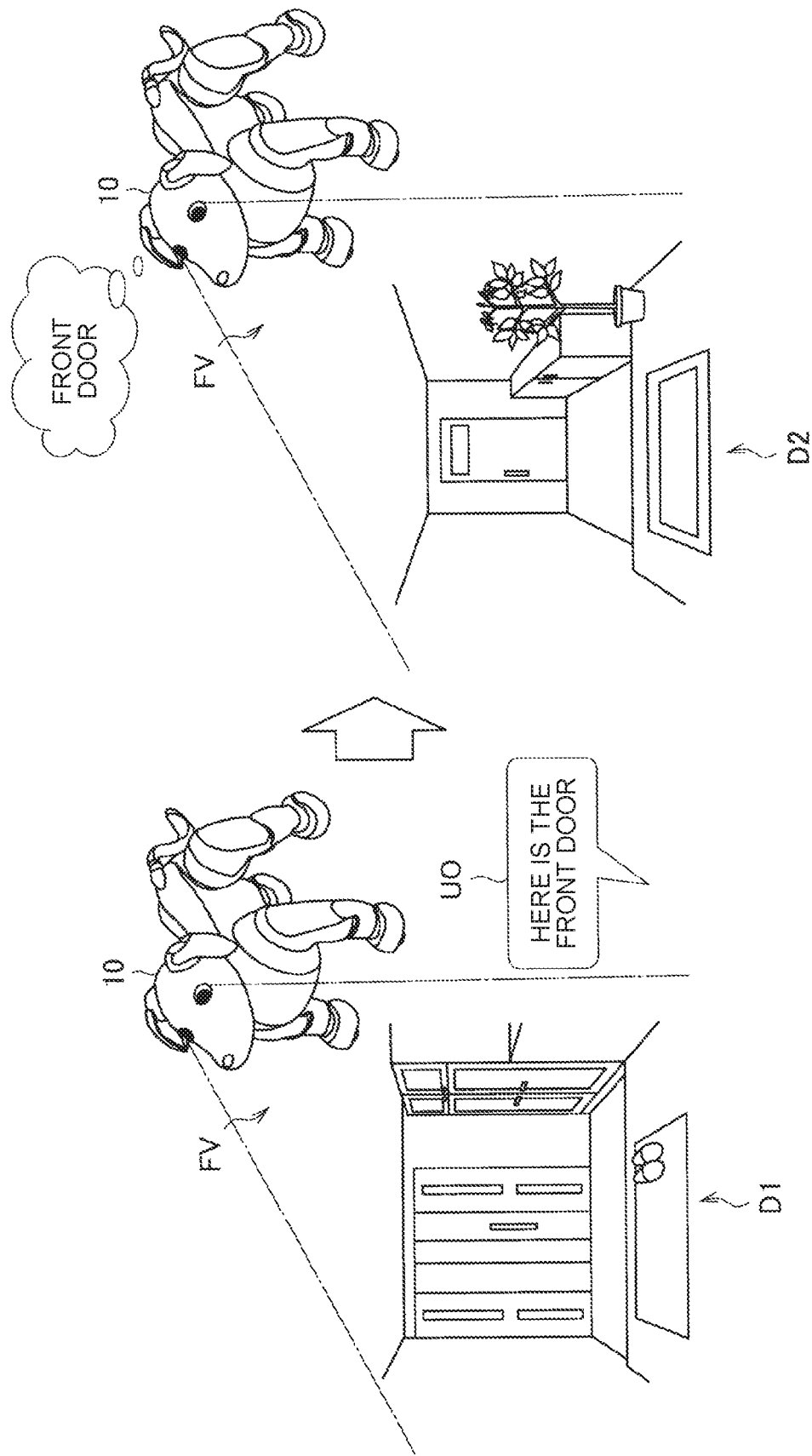
FIG. 12 is a diagram illustrating the overview of space region recognition learning performed based on the teaching according to the first embodiment.

FIG. 12 is a diagram illustrating the overview of the space region recognition learning performed based on the teaching according to the first embodiment. In the example illustrated in FIG. 12, the user teaches the autonomous mobile object 10 about the "front door" representing a space region D1.

More particularly, as illustrated in the left-hand side in FIG. 12, the user is using the speech UO to teach that the space region D1 in which the autonomous mobile object 10 is present represents the "front door".

At that time, the recognizing unit 120 according to the first embodiment can recognize the phrase "here" included in the speech UO, and can detect that the user is teaching about the space region D1. Moreover, based on the speech such as "remember the area" uttered by the user, the recognizing unit 120 can detect that the teaching is about space region recognition.

Then, based on the speech UO of the user, the recognizing unit 120 identifies the space region D1, in which the autonomous mobile object 10 is currently present, as the learning target. Moreover, the operation control unit 150 according to the first embodiment instructs the input unit 110 to photograph the space region that is identified as the learning target by the recognizing unit 120.

Moreover, the recognizing unit 120 performs morphological analysis of the speech UO of the user, and extracts the noun phrase "front door" used as the label.

Then, the learning unit 130 associates the extracted label to the photographed image of the learning target, treats the label and the image as the learning data, and performs space region recognition learning regarding the "front door".

In this way, in the autonomous mobile object 10 according to the first embodiment, learning data regarding various space regions can be automatically collected in addition to collecting the learning data regarding objects and actions, and space region recognition learning can be performed based on that learning data.

In the example explained above, an image of a space region is used as the learning data. In that regard, for example, the learning unit 130 according to the first embodiment can use, as the features of the space region that need to be learnt, the fact that the user being tracked in the space region D1 often disappears (i.e., goes outside) and the fact that conversations such as "I am back home" and "I am off" are often detected.

As a result of the abovementioned function of the autonomous mobile object 10 according to the first embodiment, the learning based on the teaching is performed in a repeated manner, and the collective wisdom acquired by the information processing server 20 is used so that, as illustrated in the right-hand side in FIG. 12, a space region D2 having a different atmosphere than the space region D1 can also be recognized as the "front door".

Till now, the explanation was given about the examples of pattern recognition learning according to the first embodiment. Given below is the detailed explanation about photographing a learning target according to the first embodiment. As explained above, the operation control unit 150 according to the first embodiment has the function of instructing the input unit 110 to photograph the learning target identified by the recognizing unit 120.

At that time, the operation control unit 150 according to the first embodiment can control the input unit 110 and the driving unit 160 in such a way that pattern recognition is performed with high accuracy and efficiency.

For example, the operation control unit 150 according to the first embodiment can control the driving unit 160 to vary the position and the posture of the autonomous mobile object 10 in such a way that the identified object is correctly photographed in entirety.

Figure 13:
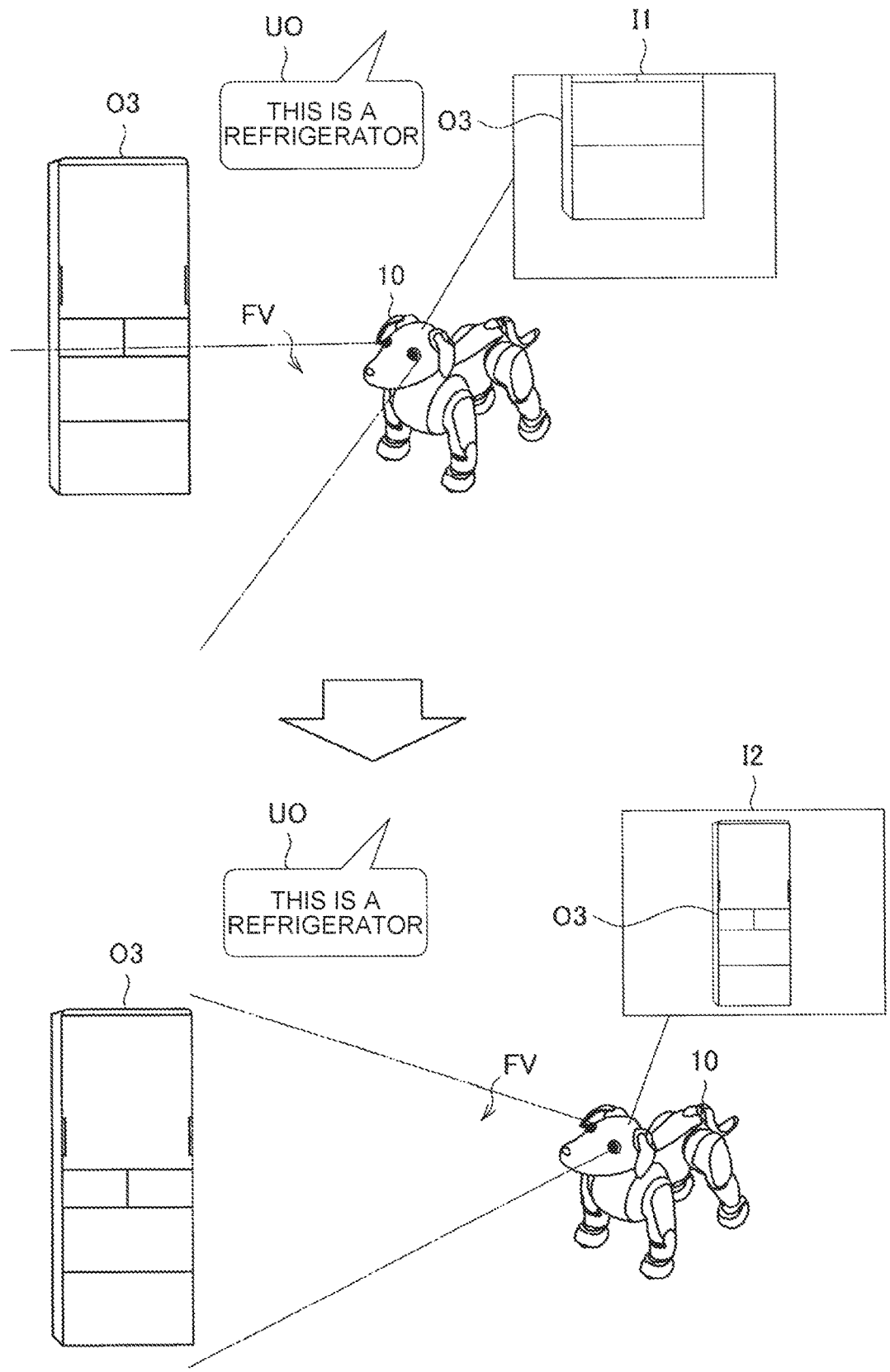
FIG. 13 is a diagram for explaining photographing control performed for photographing a learning target according to the first embodiment.

FIG. 13 is a diagram for explaining about the photographing control performed for photographing a learning target according to the first embodiment. In FIG. 13 is illustrated an example in which the user teaches the autonomous mobile object 10 about an object O3 representing a "refrigerator" using the speech UO.

At that time, as illustrated in the upper portion in FIG. 13, when the teaching is started, the position and the posture of the autonomous mobile object 10 are such that the distance to the object O3 is too short, and thus there are times when the entire object O3 does not fit within the field of view FV. If an image I1 photographed in that state is used in performing recognition learning, then the features of the object O3 cannot be correctly extracted and it is highly likely that incorrect learning is performed.

For that reason, as illustrated in the lower portion in FIG. 13, the operation control unit 150 according to the first embodiment can move the autonomous mobile object 10 to the position and the posture from which the identified object O3 is photographable in entirety, and then instruct the input unit 110 to photograph the object O3. As a result of that function of the operation control unit 150 according to the first embodiment, based on an image I2 in which the entire object O3 is correctly captured, it becomes possible to perform pattern recognition with high accuracy.

Meanwhile, if the recognizing unit 120 determines that the boundary of an object is not recognizable, then the operation control unit 150 according to the first embodiment can perform the control as explained above. For example, in the image I1 illustrated in FIG. 13, there is an area in the upper end in which the boundary between the background and the object O3 is not recognizable. In this way, when the recognizing unit 120 cannot correctly recognize the boundary between the background and the learning target, the operation control unit 150 can control the driving unit 160 until the distance between the learning target and the autonomous mobile object 10 becomes long enough for the recognizing unit 120 to be able to correctly recognize the abovementioned boundary.

On the other hand, if the distance between the learning target and the autonomous mobile object 10 is too long, then the operation control unit 150 can perform control to move the autonomous mobile object 10 closer to the learning target. At that time, based on the fact that the recognizing unit 120 has determined that the proportion of the background in the image is greater than a predetermined proportion, the operation control unit 150 can perform the abovementioned control.

As a result of the abovementioned functions of the operation control unit 150 according to the first embodiment, based on an image that is photographed when the distance to the learning target is appropriate, pattern recognition learning can be performed with efficiency.

Moreover, the operation control unit 150 according to the first embodiment can control the driving unit 160 and the input unit 110 in such a way that the learning target identified by the recognizing unit 120 is photographed from a plurality of angles.

Figure 14:
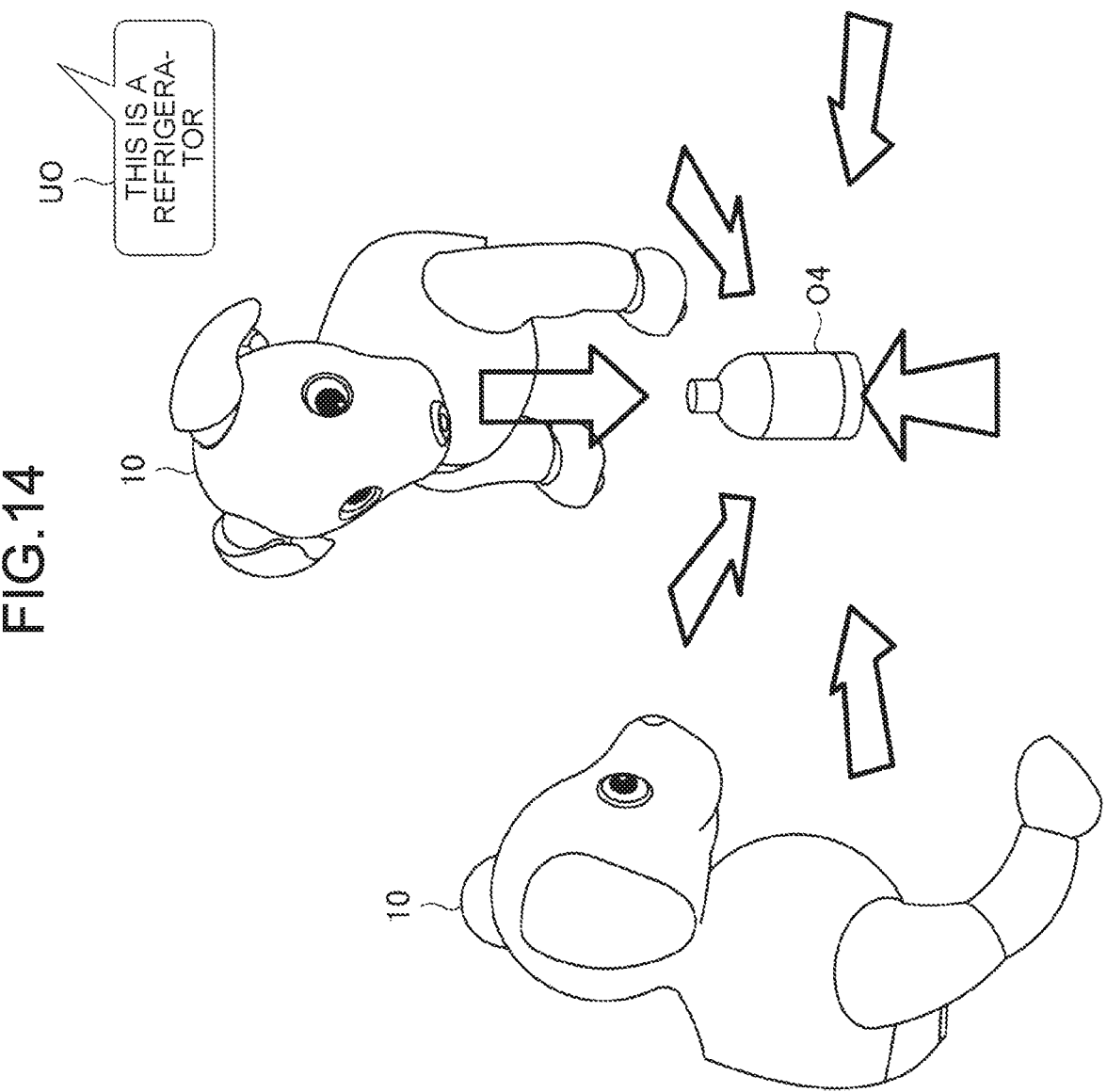
FIG. 14 is a diagram for explaining photographing control performed for photographing a learning target according to the first embodiment.

For example, in an example illustrated in FIG. 14, the operation control unit 150 controls the driving unit 160 and the input unit 110 in such a way that an object O4 representing a "plastic bottle", which is identified as the learning target by the recognizing unit 120, is photographed from the top side and five lateral sides.

That is, based on the images in which the learning target is captured from various angles, the operation control unit 150 according to the first embodiment can move the autonomous mobile object 10 and instruct photographing of a plurality of images in such a way that pattern recognition learning is performed with efficiency.

As a result of the abovementioned functions of the operation control unit 150 according to the first embodiment, as compared to the case of performing the learning based on an image in which only one lateral side of the learning target is captured, the features of the learning target can be extracted from various angles, and a learning effect having a high degree of generalization can be achieved.

Till now, the detailed explanation was given about the photographing control according to the first embodiment. The explanation till now was mainly given about the case in which the teaching according to the first embodiment is performed by the user. However, the teaching according to the first embodiment is not limited to that example. Alternatively, for example, the teaching according to the first embodiment can be performed based on the information obtained from the learning target.

For example, the teaching according to the first embodiment can be implemented using a marker such as a QR code (registered trademark) assigned to the learning target. FIG. 15 is a diagram for explaining about the teaching performed using a marker according to the first embodiment.

For example, in the upper portion in FIG. 15 is illustrated an example in which the teaching related to object recognition learning is performed using a marker M1 provided in the object O1 representing a "vacuum cleaner". In that case, the recognizing unit 120 can obtain the label "vacuum cleaner" based on the image of the marker M1 photographed by the input unit 110.

In the lower portion in FIG. 15 is illustrated an example in which the teaching related to space region recognition learning is performed using a marker M2 provided in the door installed in the space region D1 representing the "front door". In that case too, the recognizing unit 120 can obtain the label "front door" based on the image of the marker M2 photographed by the input unit 110.

In this way, as a result of using a marker according to the first embodiment, the teaching related to an object or a space region can be performed as a substitute for explicit teaching performed by the user, and the recognition ability of the autonomous mobile object 10 can be automatically enhanced.

Figure 16:
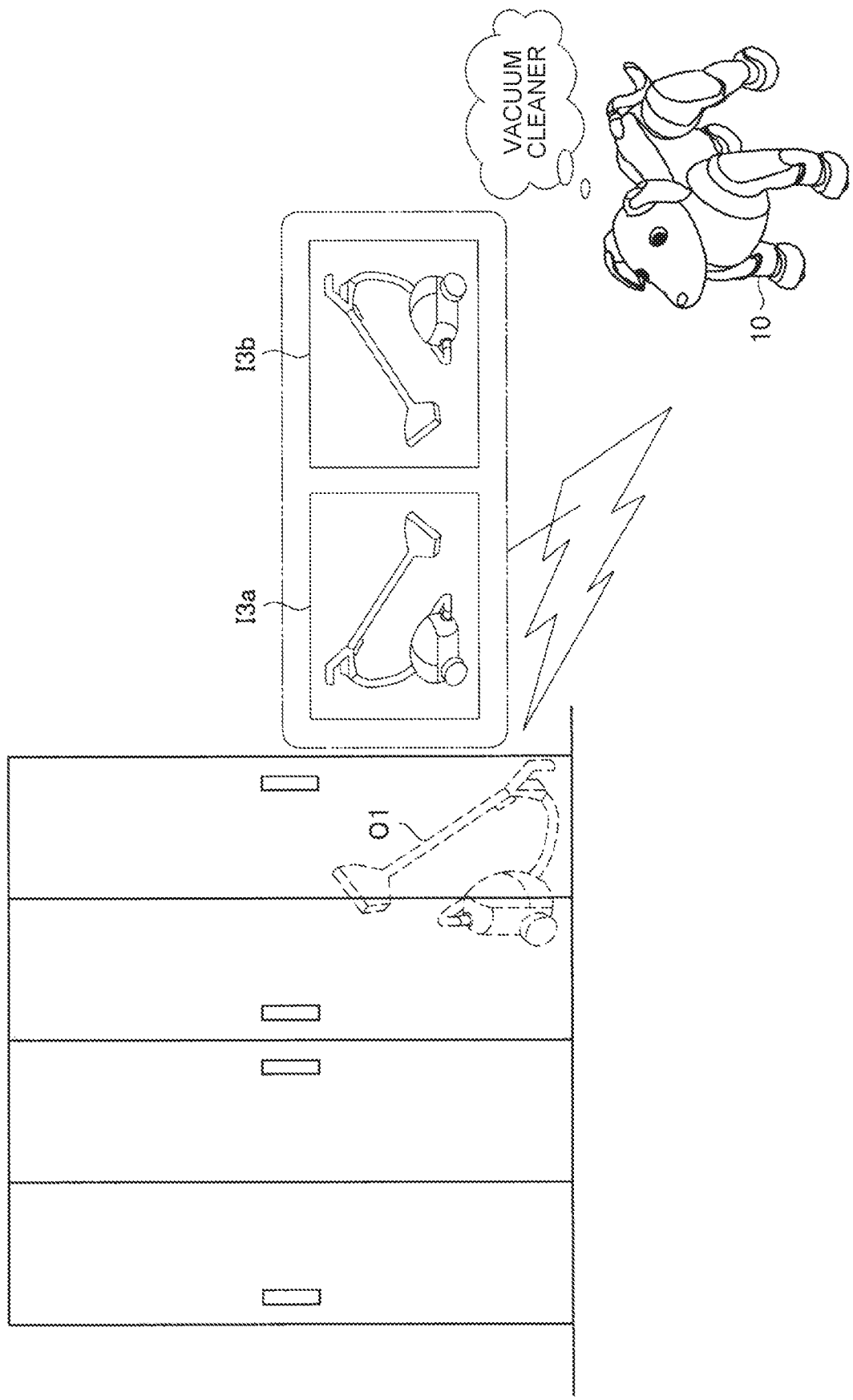
FIG. 16 is a diagram for explaining about the teaching performed using wireless communication according to the first embodiment.

Alternatively, the teaching according to the first embodiment can be performed based on the information transmitted from the learning target using wireless communication. FIG. 16 is a diagram for explaining about the teaching performed using wireless communication according to the first embodiment.

In the example illustrated in FIG. 16, the object O1 representing a "vacuum cleaner" sends the label "vacuum cleaner" and images 13a and 13b to the autonomous mobile object 10 using wireless communication. Based on the received label "vacuum cleaner" and the images 13a and 13b, the learning unit 130 according to the first embodiment can perform object recognition learning related to the object O1.

As a result of performing the teaching using wireless communication, for example, as illustrated in FIG. 16, even when the object O3 representing the learning target cannot be photographed on account of being kept inside a closet; the images that are kept ready in advance can be sent along with the label to the autonomous mobile object 10, so that the autonomous mobile object 10 can perform object recognition learning related to the object O3.

As far as the wireless communication according to the first embodiment is concerned, for example, NFC (Near Field Communication), or Bluetooth (registered trademark), or RFID (Radio Frequency Identification), or a beacon can be used.

Meanwhile, the teaching according to the first embodiment can be implemented also using inaudible sounds such as ultrasonic sound waves that are emitted by the learning target. FIG. 17 is a diagram for explaining about the teaching performed using inaudible sounds according to the first embodiment.

In the example illustrated in FIG. 17, the teaching is performed using predetermined inaudible sounds emitted by an object O5 representing a "washing machine" when in operation. For example, in the upper portion in FIG. 17 is illustrated an example in which, based on an inaudible sound NAS1 emitted by the object O5 during "draining", the recognizing unit 120 detects that the object O5 is a "washing machine" and detects that the object O5 is performing "draining".

For example, in the lower portion in FIG. 17 is illustrated an example in which, based on an inaudible sound NAS2 emitted by the object O5 during "drying", the recognizing unit 120 detects that the object O5 is a "washing machine" and detects that the object O5 is performing "drying".

In this way, as a result of the teaching performed using inaudible sounds according to the first embodiment, not only the name of the object can be taught but the operating state of that object can also be taught. Moreover, as a result of the teaching performed using inaudible sounds according to the first embodiment, for example, the learning unit 130 can also learn an audible sound AS1 representing the operating noise emitted during "draining" by the object O5, learn an audible sound AS2 representing the operating noise emitted during "drying" by the object O5, as well as learn the operating state of the object O5. As a result of performing such learning in a repeated manner, the autonomous mobile object 10 according to the first embodiment becomes able to gradually acquire the recognition ability with respect to the objects that do not emit inaudible sounds.

Till now, the explanation was given about the variations of the teaching performed according to the first embodiment. Given below is the explanation about the correction of the association between labels and learning targets according to the first embodiment. As explained earlier, the autonomous mobile object 10 according to the first embodiment can perform pattern recognition learning based on a variety of teaching.

However, for example, at the time of performing learning based on the teaching by the user, it is also possible to think of a situation in which a learning target or a label is obtained by mistake. In that regard, the application control unit 240 of the information processing server 20 according to the first embodiment can provide a user interface for enabling the user (or the developer, or the service provider) to correct the association between labels and learning targets.

Figure 18:
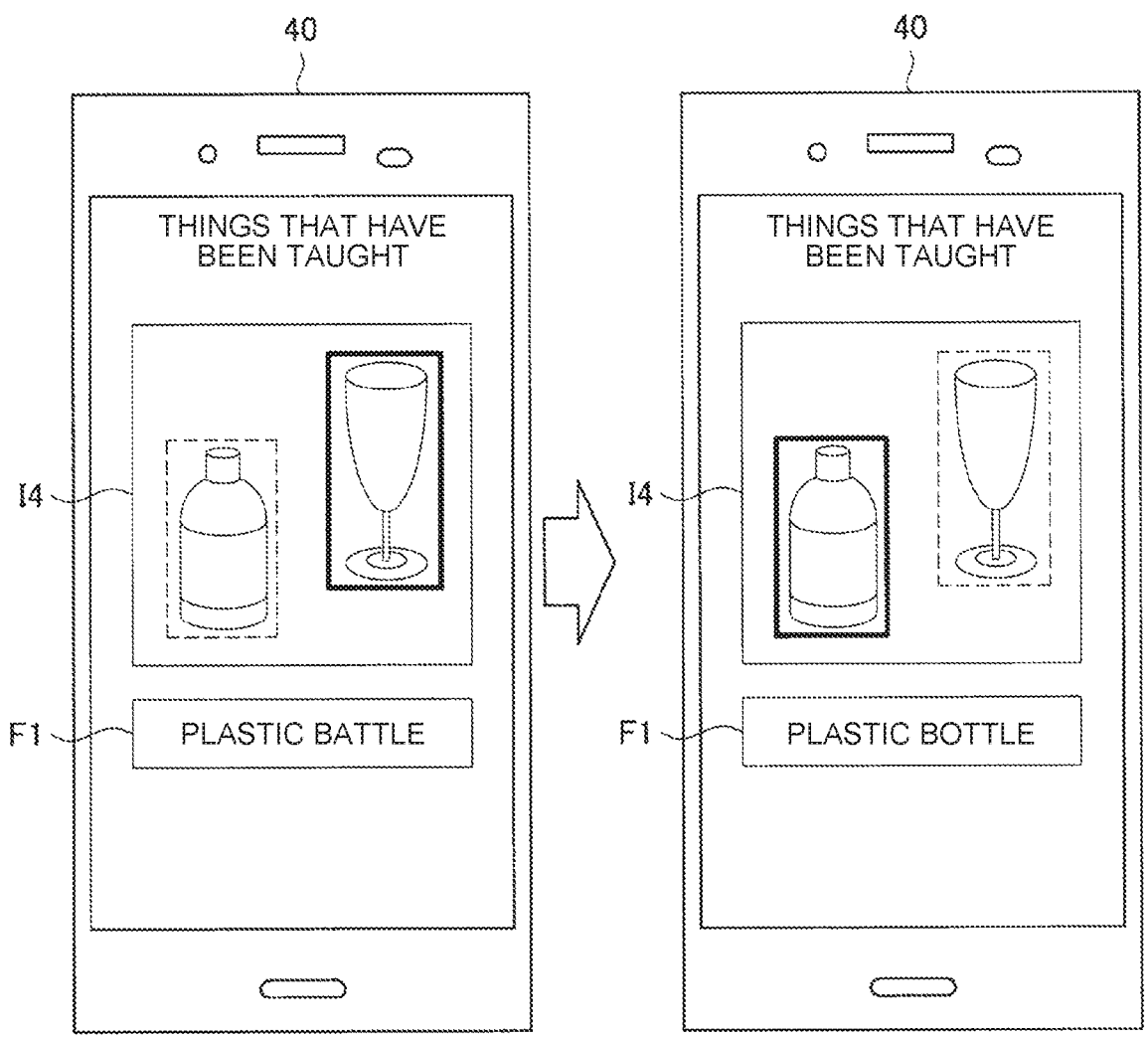
FIG. 18 is a diagram illustrating an example of a user interface according to the first embodiment.
Figure 19:
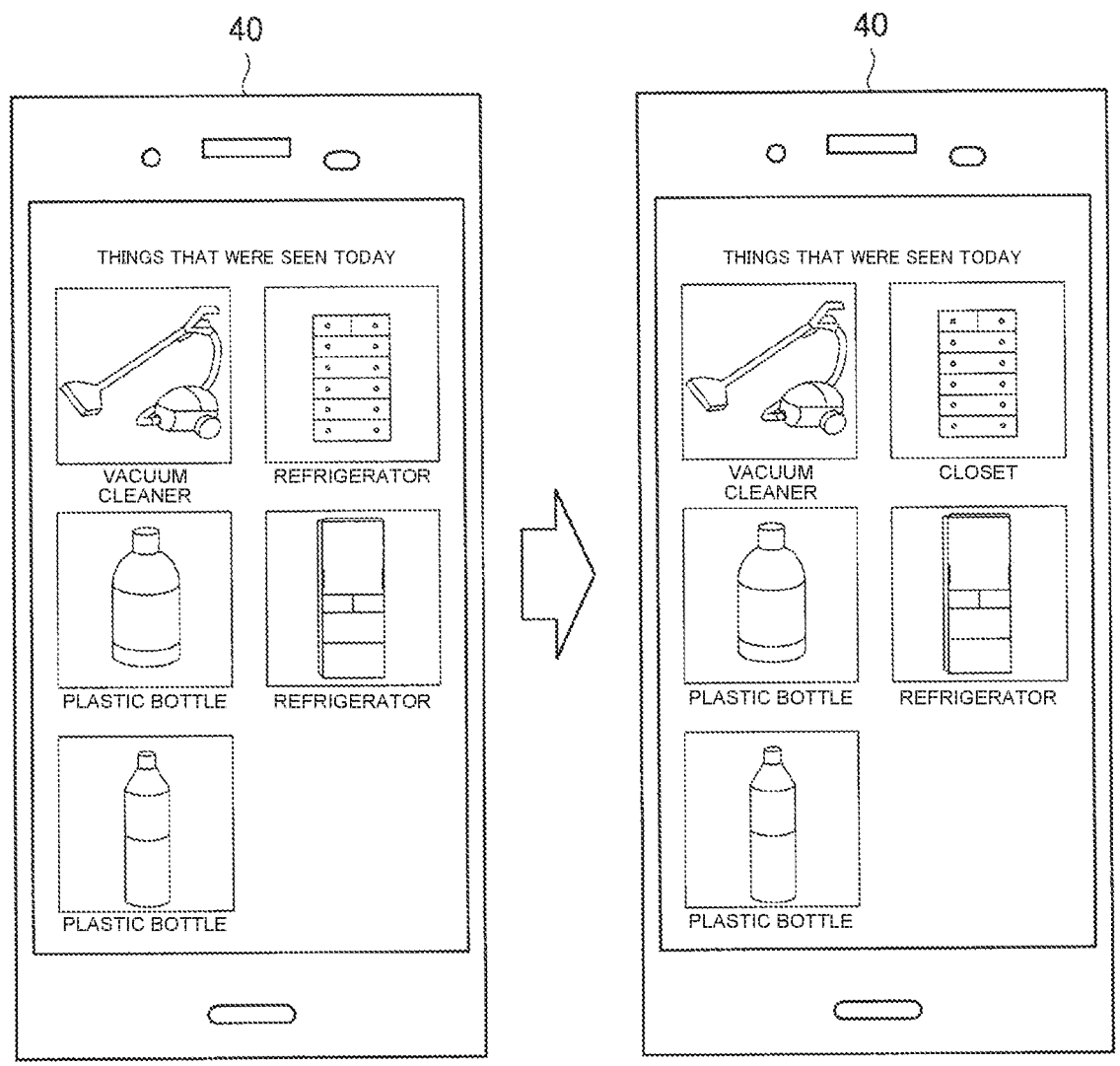
FIG. 19 is a diagram illustrating an example of the user interface according to the first embodiment.

FIGS. 18 and 19 are diagrams illustrating examples of the user interface according to the first embodiment. For example, in FIG. 18 is illustrated an example of the user interface that, after pattern recognition learning has been performed based on the teaching, is displayed by the application control unit 240 in an information processing terminal 40 in possession of the user.

In the example illustrated in FIG. 18, although the user has specified a "plastic bottle" by pointing it with a finger and has performed the teaching using speech, a "glass" that is present near the "plastic bottle" is mistakenly identified as the learning target as illustrated in the left-hand side in FIG. 18, and the label is mistakenly extracted as "plastic battle".

At that time, as illustrated in the right-hand side in FIG. 18, in an image I4 displayed in the user interface, the user selects the boundary recognition result regarding "plastic bottle" representing the correct learning target and inputs the correct spelling "plastic bottle" in a field F1 corresponding to the labels. Thus, the learning target and the label that are mistakenly associated can be corrected with ease.

Meanwhile, the user can be enabled to correct the association not only immediately after the learning based on the teaching, but also from the history of pattern recognition performed by the autonomous mobile object 10.

For example, in FIG. 19 is illustrated an example of the user interface for displaying the objects that have been recognized by the autonomous mobile object 10 during its autonomous behavior. With reference to the history illustrated in the left-hand side in FIG. 19, the object named "closet" is mistakenly recognized as "refrigerator".

At that time, the user can be enabled to select the history of the wrong recognition, input the correct label, and correct the association as illustrated in the right-hand side in FIG. 19. In this way, as a result of providing the user interface under the control of the application control unit 240 according to the first embodiment, the details of any wrong learning can be found immediately after the learning or at an arbitrary subsequent point of time, and can be corrected with ease.

Meanwhile, alternatively, the correction of the learning result according to the first embodiment can be automatically performed by the autonomous mobile object 10. For example, the learning unit 130 according to the first embodiment can compare the learning result stored in the information processing server 20 with the learning result obtained in the corresponding autonomous mobile object 10; detect a mismatch between the collective wisdom and the learnt knowledge of the corresponding autonomous mobile object 10; and automatically correct a label or a learning target.

Till now, the explanation was given about the learning based on the teaching according to the first embodiment, and about the correction of the learning result. As a result of the abovementioned functions of the autonomous mobile object 10 and the information processing server 20 according to the first embodiment; even when the learning data is not provided in advance, it can be dynamically collected and learnt on a day-to-day basis, thereby enabling achieving enhancement in the recognition ability of the autonomous mobile object 10 with less burden and more efficiency.

Meanwhile, in order to collect the learning data with still more efficiency, the operation control unit 150 according to the first embodiment can instruct the autonomous mobile object 10 to perform a guiding operation to guide the user to do teaching.

Figure 20:
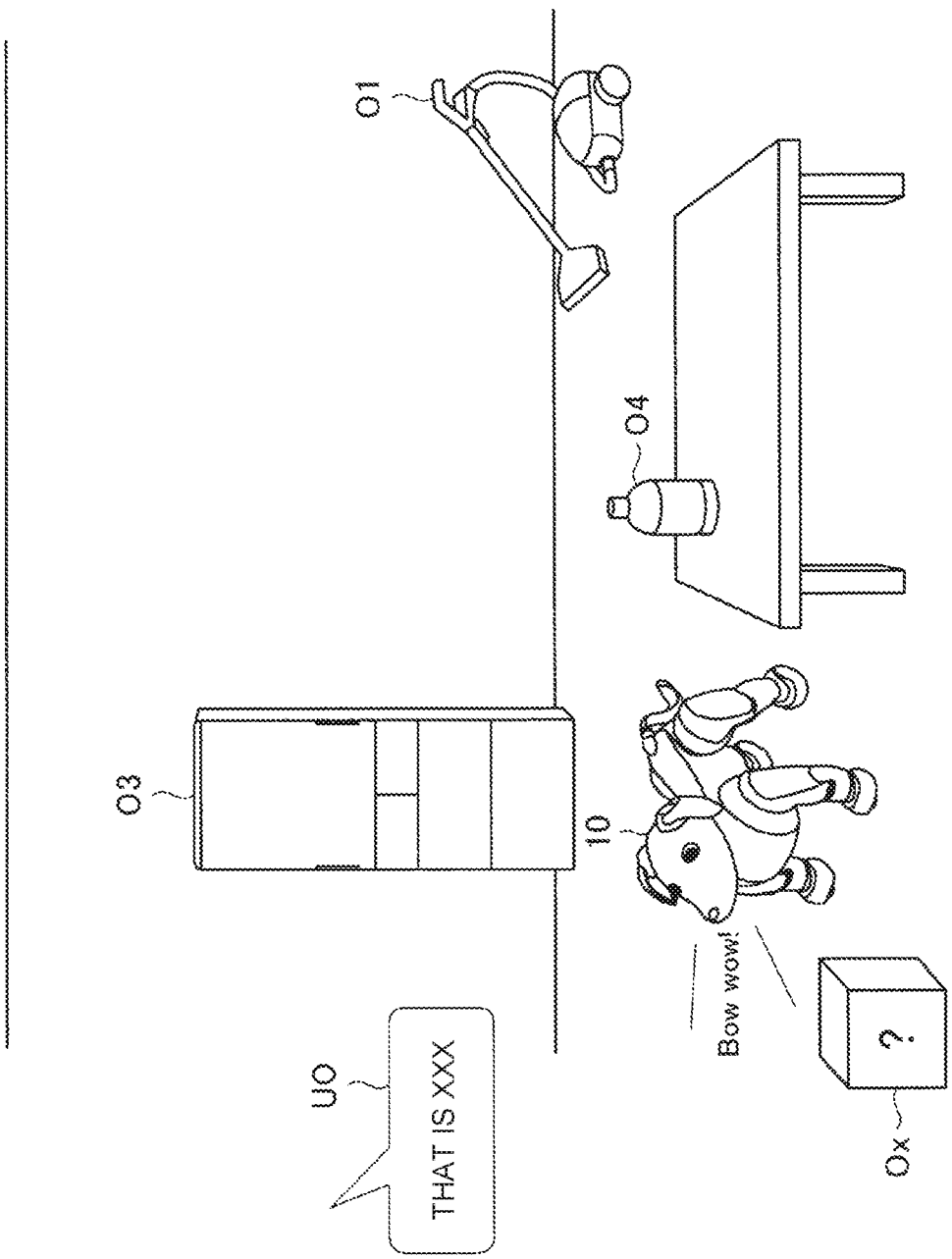
FIG. 20 is a diagram for explaining about a guiding operation according to the first embodiment.

FIG. 20 is a diagram for explaining about the guiding operation according to the first embodiment. For example, while the autonomous mobile object 10 is performing autonomous actions, if the recognizing unit 120 detects an unknown object Ox that is not recognizable, then the operation control unit 150 according to the first embodiment can instruct the autonomous mobile object 10 to perform the guiding operation to guide the user to do teaching about the object Ox.

In the example illustrated in FIG. 20, based on the detection of the unrecognizable object Ox by the recognizing unit 120, the operation control unit 150 instructs the autonomous mobile object 10 to perform the guiding operation in the form of barking at the object Ox.

In this way, as a result of performing the guiding operation according to the first embodiment, it becomes possible to increase the likelihood that the user does teaching about the unknown object Ox; and the learning data can be expected to be collected with more efficiency.

Examples of the guiding operation according to the first embodiment include barking, sniffing, ramping, tilting the head to a side, looking alternately at the user and the target, and becoming frightened.

Moreover, besides instructing the autonomous mobile object 10 to perform the guiding operation, the operation control unit 150 according to the first embodiment can instruct the autonomous mobile object 10 to take various other actions with respect to a learnt event.

For example, by taking an action with respect to a newly-recognized object such as an article of furniture, the operation control unit 150 can prompt the user to use that article of furniture. For example, based on the fact that the "vacuum cleaner" has not been operated for a predetermined period of time or more, the operation control unit 150 can instruct the autonomous mobile object 10 to take an action as explained above.

Furthermore, for example, regarding an object that is defined as a favorite object from among the objects learnt by the autonomous mobile object 10, the operation control unit 150 can instruct the autonomous mobile object 10 to express affection by hugging or embracing the favorite object. Such favorite objects can be defined based on, for example, the recognition count or the object identification (such as the manufacturers).

Moreover, for example, the operation control unit 150 can instruct the autonomous mobile object 10 to imitate newly-learnt actions. At that time, based on sequence data that is generated from the photographed images of the actions, the operation control unit 150 can instruct the autonomous mobile object 10 to take the learnt actions. Herein, the sequence data can be the information containing the time series variation of the rotation positions of the joint regions of the autonomous mobile object 10 and containing control signals related to eyeball expressions and audio output. For example, the sequence data is generated based on the joint position estimation of the object performing actions and based on the estimation of the magnitude of the bending action.

Furthermore, for example, when the learning unit 130 newly learns an action such as an exercise performed by the user; based on the learning data of the exercise that is stored as the collective wisdom in the information processing server 20, the operation control unit 150 can instruct the autonomous mobile object 10 to exhibit behavior related to the evaluation of the exercise of the user. At that time, for example, the evaluation can be done based on the divergence from the average value of the learning data stored as the collective wisdom.

Moreover, for example, when the learning unit 130 has newly learnt about the "front door", the operation control unit 150 can control the driving unit 160 and the output unit 170 in such a way that, when the user returns home, the autonomous mobile object 10 receives the user at the "front door".

Furthermore, for example, when the learning unit 130 has also learnt about the operating state of an object; if abnormality is detected from the operating sound, the operating control unit 150 can instruct the autonomous mobile object 10 to notify about the abnormality. Moreover, for example, the operation control unit 150 can instruct the autonomous mobile object 10 to perform actions according to the operating state of the recognized object. For example, when it is recognized that a microwave oven is in operation, the operation control unit 150 can instruct the autonomous mobile object 10 to keep the plates ready.

«1.7. Flow of Operations»

Figure 21:
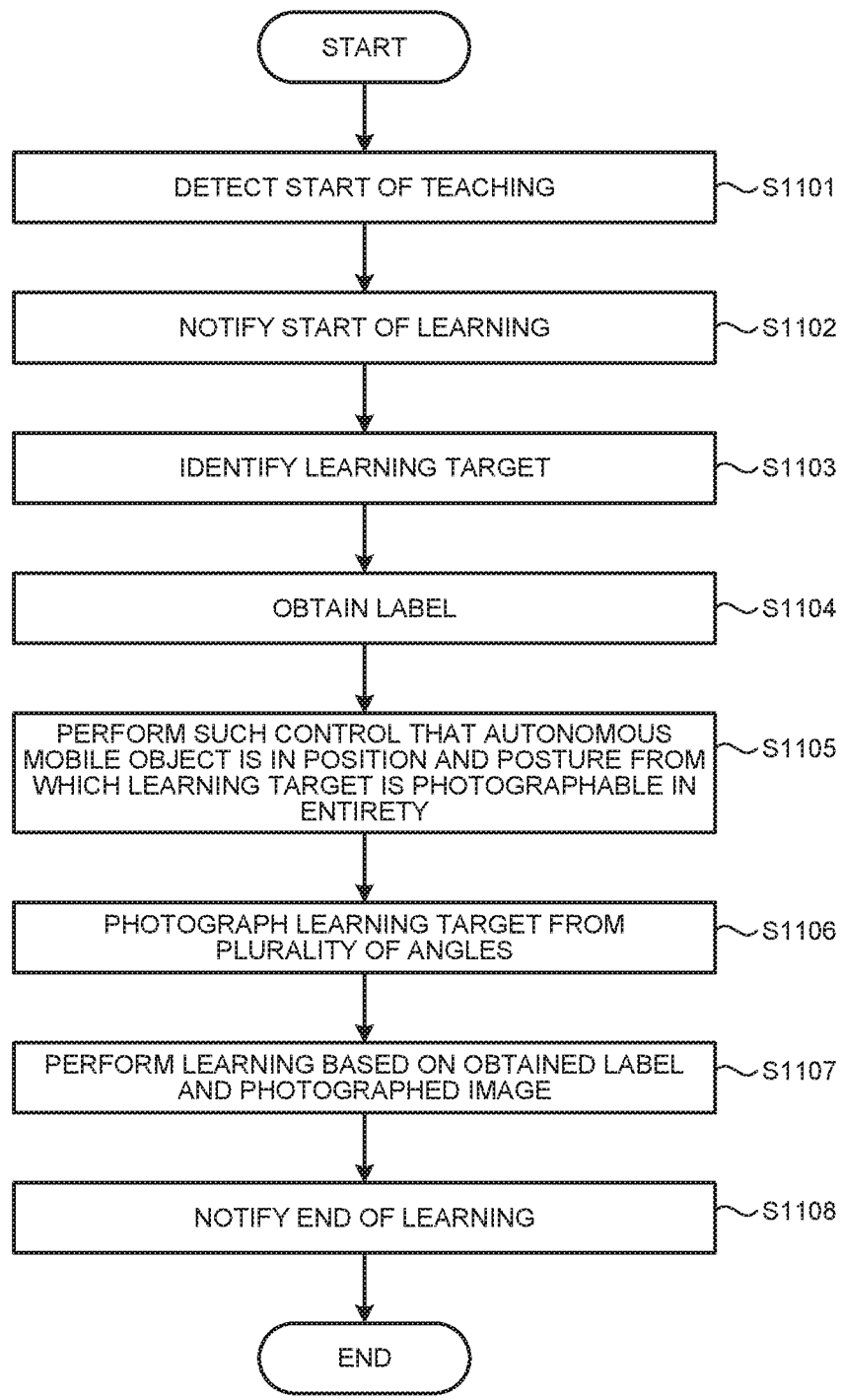
FIG. 21 is a flowchart for explaining about the flow of operations performed in the autonomous mobile object 10 according to the first embodiment.

Given below is the detailed explanation of the flow of operations performed in the autonomous mobile object 10 according to the first embodiment. FIG. 21 is a flowchart for explaining about the flow of operations performed in the autonomous mobile object 10 according to the first embodiment.

With reference to FIG. 21, firstly, the recognizing unit 120 detects teaching (S1101). For example, the recognizing unit 120 can detect the start of teaching based on a speech of the user, or based on the detection of a QR code, or based on the reception of information via wireless communication, or based on the detection of an inaudible sound.

Then, based on the start of the teaching as detected at Step S1101, the operation control unit 150 instructs the autonomous mobile object 10 to perform an action indicating the start of pattern recognition learning (S1102). Examples of that action include barking, moving the ears or the tail, and changing the color of the irises.

Subsequently, the recognizing unit 120 identifies the learning target (S1103). For example, the recognizing unit 120 can identify the learning target based on a gesture such as pointing with a finger as performed by the user, or can identify the learning target based on the information obtained from the learning target.

Moreover, the recognizing unit 120 obtains the label (S1104). For example, the recognizing unit 120 can extract the label from the speech of the user, or can obtain the label from the information obtained from the learning target.

Then, the operation control unit 150 controls the driving unit 160 in such a way that the autonomous mobile object 10 is in the position and the posture from which the learning target, which is identified at Step S1103, is photographable in entirety (S1105).

Subsequently, the operation control unit 150 controls the driving unit 160 and the input unit 110 in such a way that the learning target is photographed from a plurality of angles (S1106).

Then, the learning unit 130 performs pattern recognition learning based on the label obtained at Step S1104 and the image photographed at Step S1106 (S1107).

Subsequently, the operation control unit 150 instructs the autonomous mobile object 10 to perform an action indicating the end of pattern recognition learning (S1102). Examples of that action include barking, moving the ears or the tail, and changing the color of the irises.

2. Second Embodiment

«2.1. Overview»

Till now, the explanation was given about the first embodiment. Given below is the explanation of a second embodiment. In the first embodiment described above, the teaching related to pattern recognition learning is performed based on the speech or the gesture of the user or based on the information obtained from the learning target. In the second embodiment, the explanation is given about the teaching performed mainly using an environmental map.

An environmental map according to the second embodiment implies a map that includes information about the placement of the objects in the real space in which the autonomous mobile object 10 is present, and that includes information about the structure of the building. For example, an environmental map according to the second embodiment can be a map that enables the user to visualize the information obtained using SLAM (a map that enables the user to visualize is sometimes simply called a SLAM map). As explained earlier, the autonomous mobile object 10 according to the second embodiment can implement SLAM using the images photographed by the wide-angle camera installed in the loin region (i.e., the camera 520).

In the second embodiment of the application concerned, the environmental map generated in the abovementioned manner is presented to the user, and the user labels an arbitrary specified area in the environmental map, and performs teaching related to pattern recognition learning of the space regions.

For that reason, one of the features of the application control unit 240 of the information processing server 20 according to the second embodiment is to control a user interface that enables the user to perform teaching using the environmental map. For example, the application control unit 240 according to the second embodiment provides the user interface as a function of a web application, and can display the user interface in the information processing terminal 40, such as a smartphone or a PC (Personal Computer), that is in possession of the user. Meanwhile, alternatively, the control function for the user interface can be implemented as a function of the autonomous mobile object 10.

Given below is the detailed explanation of the teaching performed using the environmental map according to the second embodiment. The following explanation is given mainly about the differences with the first embodiment, and the functions and the effects identical to the first embodiment are not explained again in detail.

«2.2. Details of Teaching Using Environmental Map»

Figure 22:
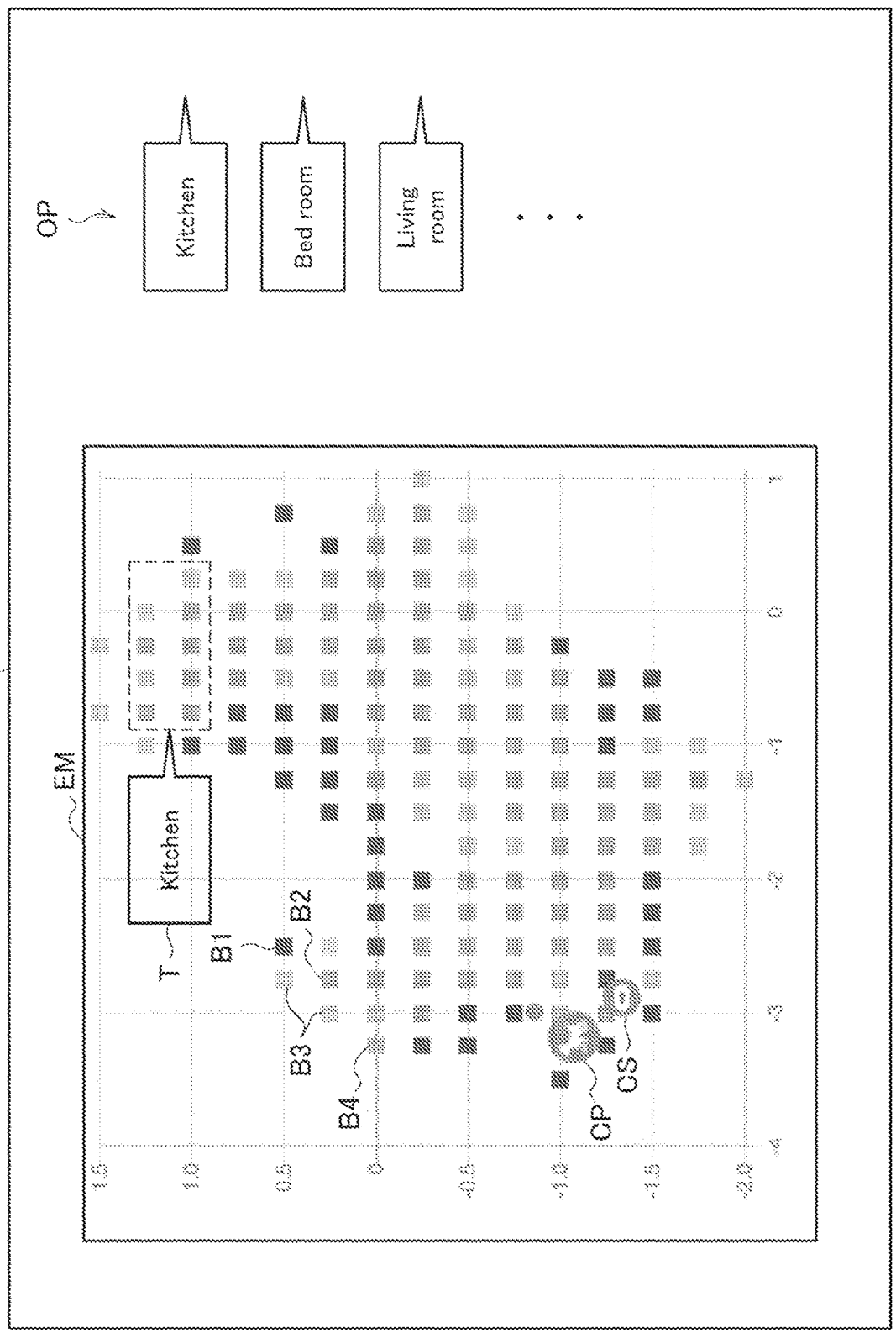
FIG. 22 is a diagram illustrating an example of a user interface meant for enabling teaching using an environmental map according to a second embodiment of the application concerned.

In FIG. 22 is illustrated an example of a user interface UI2 meant for enabling teaching using an environmental map according to the second embodiment. As illustrated in FIG. 22, in the user interface UI2 according to the second embodiment, the user is presented with an environmental map EM that is generated based on the sensor information collected by the autonomous mobile object 10. As explained earlier, the environmental map EM according to the second embodiment can be, for example, a SLAM map. The application control unit 240 can put a SLAM map, which is received from the autonomous mobile object 10, in the user interface UI2. Alternatively, the environmental map EM, such as a SLAM map, can be generated by the information processing server 20 based on the sensor information (including position information and images) collected from the autonomous mobile object 10. The following explanation is given under the assumption that the environmental map according to the second embodiment is a SLAM map.

In the environmental map EM according to the second embodiment, for example, the information about the real space as recognized by the autonomous mobile object 10 can be indicated in the units of blocks. In the example illustrated in FIG. 22, in the environmental map EM, a plurality of blocks defined by a predetermined unit (distance) is placed in the two-dimensional coordinate system corresponding to the horizontal plane in the real space.

The blocks represent the attributes of the corresponding space regions in the real space. For example, a block B1 represents a space region (such as a wall) into which the autonomous mobile object 10 cannot move (enter). Moreover, a block B2 represents a space region into which the autonomous mobile object 10 has actually moved in the past (i.e., a space region allowing movement). Furthermore, blocks B3 represent space regions into which the autonomous mobile object 10 has not yet moved. Moreover, a block B4 represents a region for which it is difficult to determine about whether or not movement thereto can be made or whether movement thereto is yet to be made.

Regarding such space regions represented by the blocks B1 to B4, for example, the attributes can be expressed using the differences in colors, patterns, and shapes. In FIG. 22 is illustrated an example in which the attributes are expressed using the differences in colors.

Moreover, as illustrated in FIG. 22, in the environmental map EM according to the second embodiment, a current position CP of the autonomous mobile object 10 and the position of a charge station CS meant for supplying electrical power to the autonomous mobile object 10 can also be indicated.

In the environmental map EM displayed in the user interface UI2, the user can specify an arbitrary specified area and label it, and can perform teaching related to the space region in the real space corresponding to that specified area.

At that time, firstly, the user selects an arbitrary specified area by performing a dragging operation in the environmental map EM. In the explanation illustrated in FIG. 22, the area selected and specified by the user is indicated using dotted lines. Then, the user assigns a tag T, that is, a label including the name of the space region to the selected specified area. In FIG. 22 is illustrated an example in which the user assigns the tag T including the name "Kitchen" to the selected specified area.

In this way, one of the features of the application control unit 240 according to the second embodiment is to provide the user with a way for specifying, in the user interface UI2, an arbitrary specified area of the environmental map EM and for labeling the specified area. As a result of such features of the application control unit 240 according to the second embodiment, pattern recognition learning regarding the space regions can be performed with high accuracy and with ease using the environmental map EM in the visualized form.

Moreover, the application control unit 240 according to the second embodiment can also have the function of presenting, in the user interface UI2, the candidates for the label (tag) that can be assigned to the specified area by the user.

In the example illustrated in FIG. 22, the application control unit 240 displays, in the user interface UI2, candidates OP such as "Kitchen", "Bed room", and "Living room" as the labels (tags) that can be assigned by the user.

In this case, the user can drag the intended tag, from among the presented candidates OP, in the environmental map EM, and label the specified area with ease.

As a result of presenting in advance such a plurality of general labels as mentioned above, the application control unit 240 becomes able to absorb the variations in the naming given by each user and to keep the types of naming of the labels in check. As a result, the learning data that has a high degree of general versatility and that is sharable among a plurality of autonomous mobile objects 10 can be collected with efficiency, and pattern recognition learning can be performed with high accuracy.

Regarding the generation of the environmental map EM according to the second embodiment, the detailed explanation is given below with reference to FIGS. 23 to 27. FIGS. 23 to 27 are diagrams illustrating an example of the generation process for generating the environmental map EM according to the second embodiment. As described above, the environmental map EM according to the second embodiment can be a SLAM map intended for the user and generated based on the sensor information collected by the autonomous mobile object 10. In FIGS. 23 to 27, although the reference symbols for the blocks B1 to B4, the current position CP of the autonomous mobile object 10, and the charge station CS are not illustrated; the visual expressions common to FIGS. 22 to 27 are assumed to conform to the reference symbols illustrated in FIG. 22.

Figure 23:
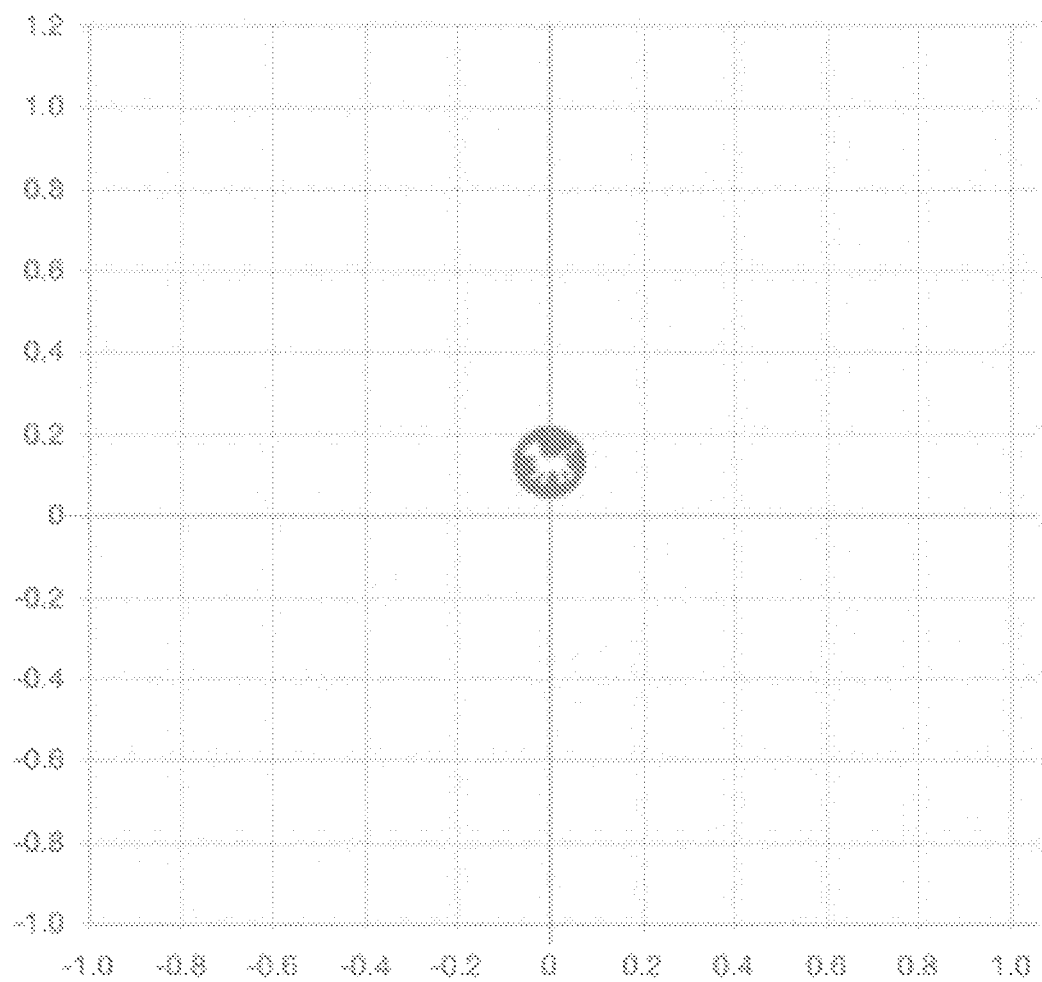
FIG. 23 is a diagram illustrating an example of a generation process for generating the environmental map according to the second embodiment.

In FIG. 23 is illustrated an example of the environmental map EM at the start of generation thereof. At that point of time, since sensor information enabling determination of the attributes of the space regions is not yet sufficiently stored, only the current position CP of the autonomous mobile object 10 is illustrated.

Figure 24:
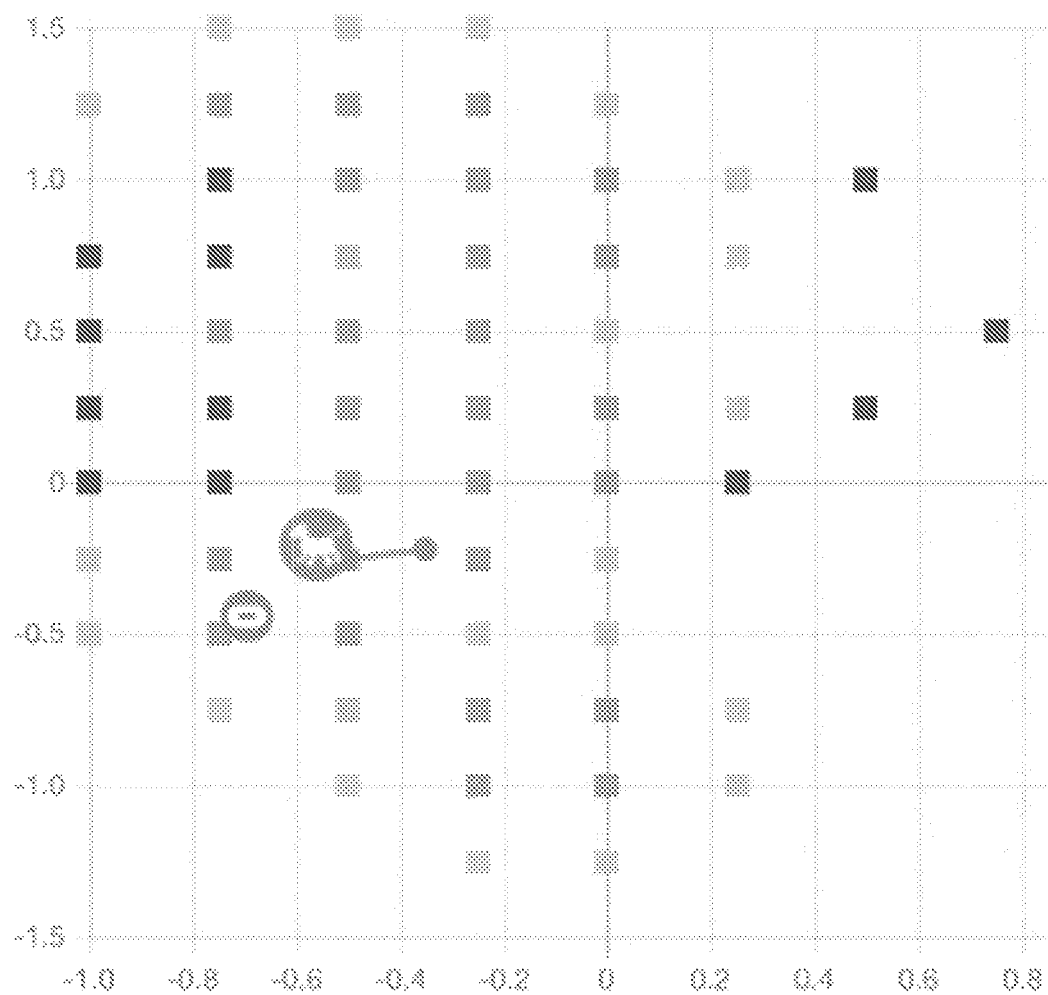
FIG. 24 is a diagram illustrating an example of the generation process for generating the environmental map according to the second embodiment.

In FIG. 24 is illustrated an example of the environmental map EM after the elapse of a certain amount of time since the point of time illustrated in FIG. 23. With reference to FIG. 24, the attributes of the space regions are determined based on the sensor information collected accompanying the autonomous movement of the autonomous mobile object 10; and it can be understood that visual information such as the blocks B1 to B4 has been added to the environmental map EM. Moreover, as illustrated in FIG. 24, in the environmental map EM according to the second embodiment, in addition to indicating the current position CP of the autonomous mobile object 10, the locus of the movement thereof can be indicated using, for example, a line extending from the current position CP.

Figure 25:
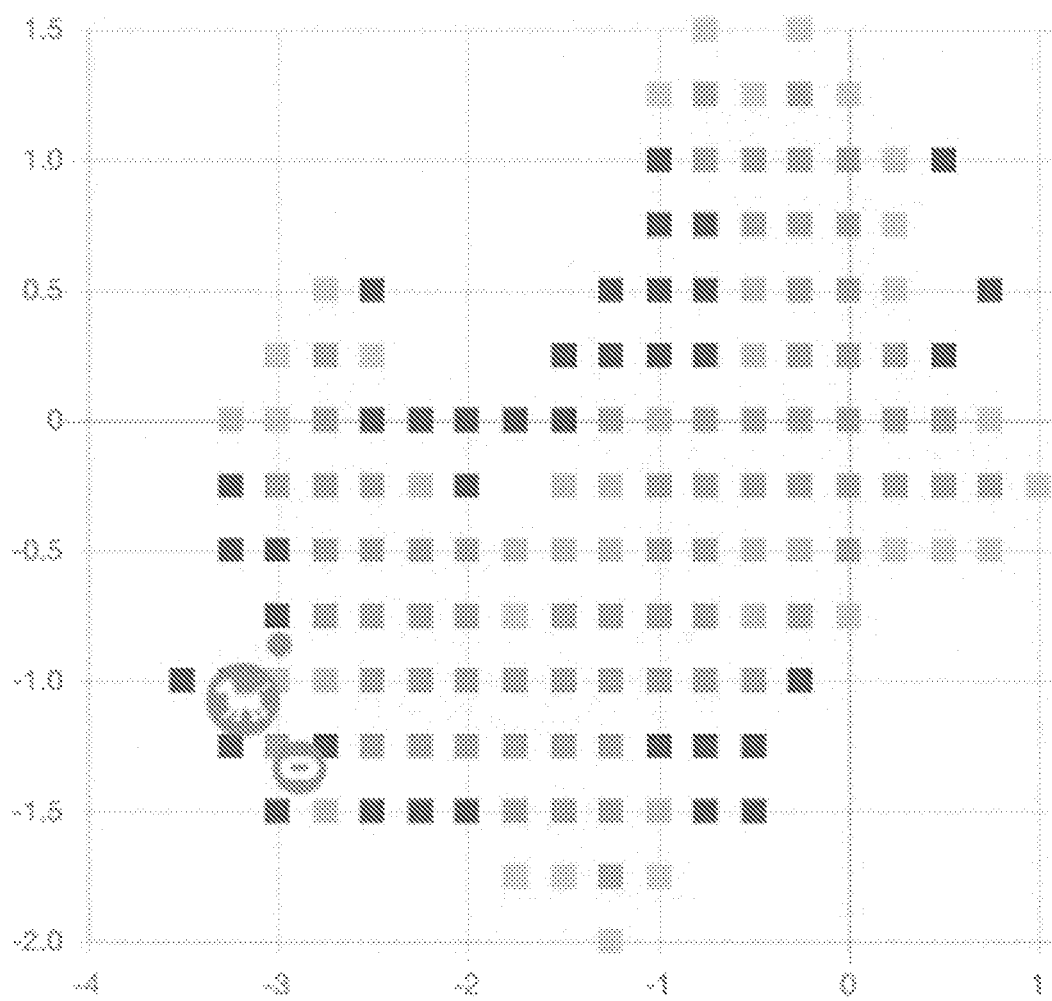
FIG. 25 is a diagram illustrating an example of the generation process for generating the environmental map according to the second embodiment.

In FIG. 25 is illustrated an example of the environmental map EM after the elapse of some more amount of time since the point of time illustrated in FIG. 24. As a result of comparing FIG. 25 with FIG. 24, it can be understood that the density of the blocks has increased because more sensor information has been stored with time. In this way, the environmental map EM according to the second embodiment can be dynamically updated based on the sensor information that is collected accompanying the autonomous movement of the autonomous mobile object 10.

Figure 26:
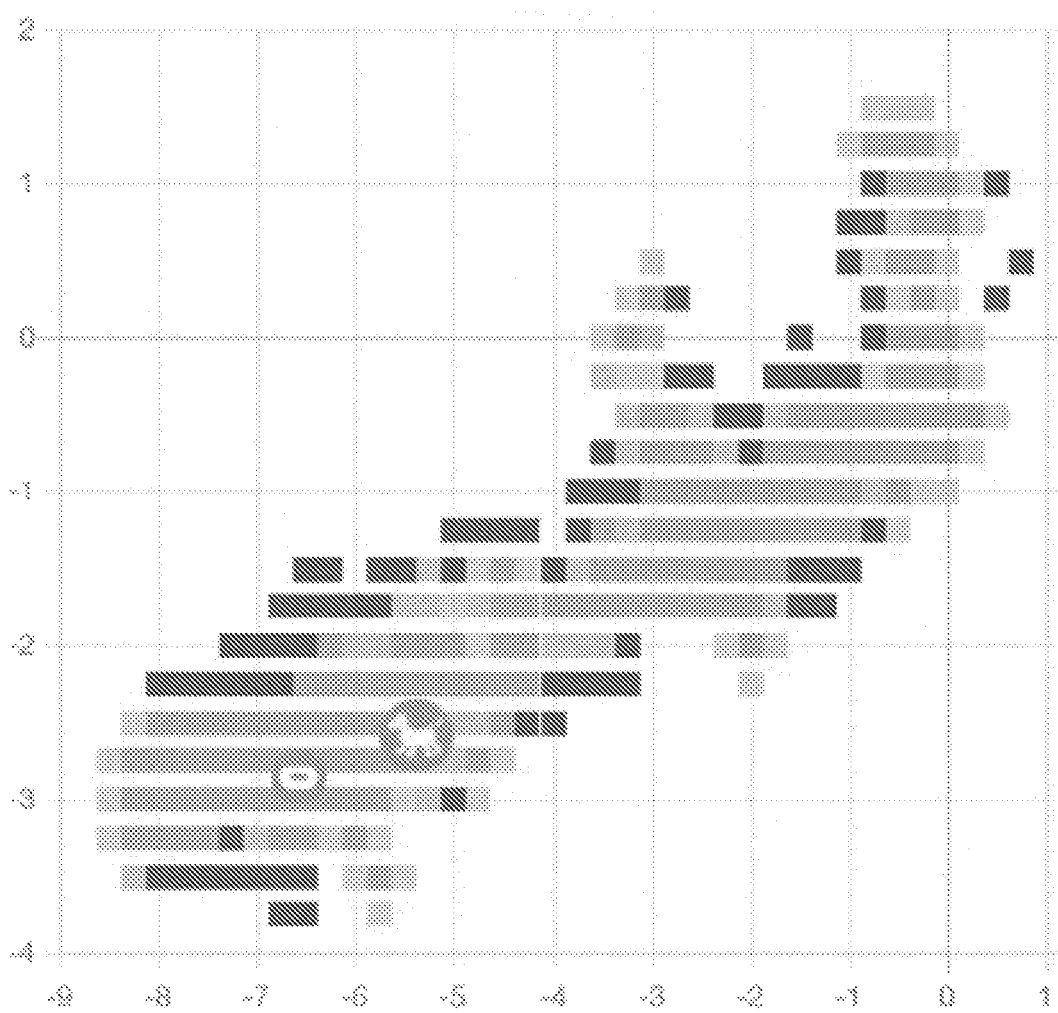
FIG. 26 is a diagram illustrating an example of the generation process for generating the environmental map according to the second embodiment.

In FIG. 26 is illustrated an example of the environmental map EM after the elapse of some more amount of time since the point of time illustrated in FIG. 25. With reference to FIG. 26, it can be understood that the scale of the environmental map EM is changed because of an expansion in the movement range of the autonomous mobile object 10, and the environmental map EM is updated as a map corresponding to a wider real space. Moreover, the density of the blocks has further increased accompanying the storage of more sensor information.

Figure 27:
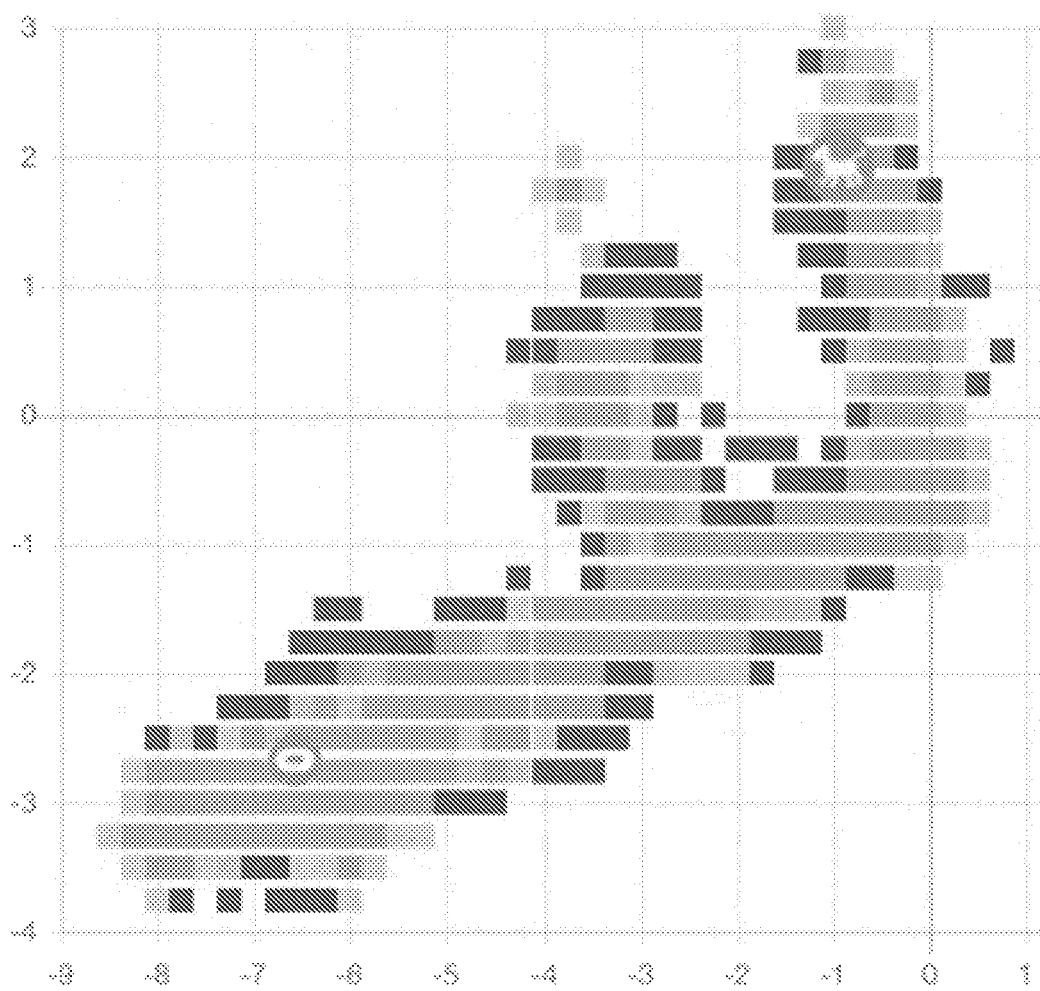
FIG. 27 is a diagram illustrating an example of the generation process for generating the environmental map according to the second embodiment.

In FIG. 27 is illustrated an example of the environmental map EM after the elapse of some more amount of time since the point of time illustrated in FIG. 26. As a result of comparing FIG. 27 with FIG. 26, the scale of the environmental map EM illustrated in FIG. 27 is further changed as compared to the environmental map EM illustrated in FIG. 26, and the environmental map EM corresponds to a still wider space region. Moreover, it can be understood that blocks are added in new areas because of the expansion in the movement range of the autonomous mobile object 10.

Till now, the explanation was given about the generation process for generating the environmental map EM according to the second embodiment. As explained above, based on the sensor information (position information and images) collected accompanying the autonomous movement thereof, the autonomous mobile object 10 according to the second embodiment can generate the environmental map EM such as a SLAM map and can dynamically update it. Moreover, the application control unit 240 according to the second embodiment displays the environmental map EM in the user interface UI2, so that the user can understand the range of the space regions in the real space that are recognized by the autonomous mobile object 10, and can put it to use in subsequent learning.

Given below is the detailed explanation about the movement control performed for moving to the space region corresponding to the specified area and about the information acquisition according to the second embodiment. As explained above, using the environmental map EM displayed in the user interface UI2, the user can assign a label to the specified area. At that time, the operation control unit 150 according to the second embodiment can move the autonomous mobile object 10 to that space region in the real space which corresponds to the specified area that has been labeled, and can instruct the autonomous mobile object 10 to obtain information about that space region.

Figure 28:
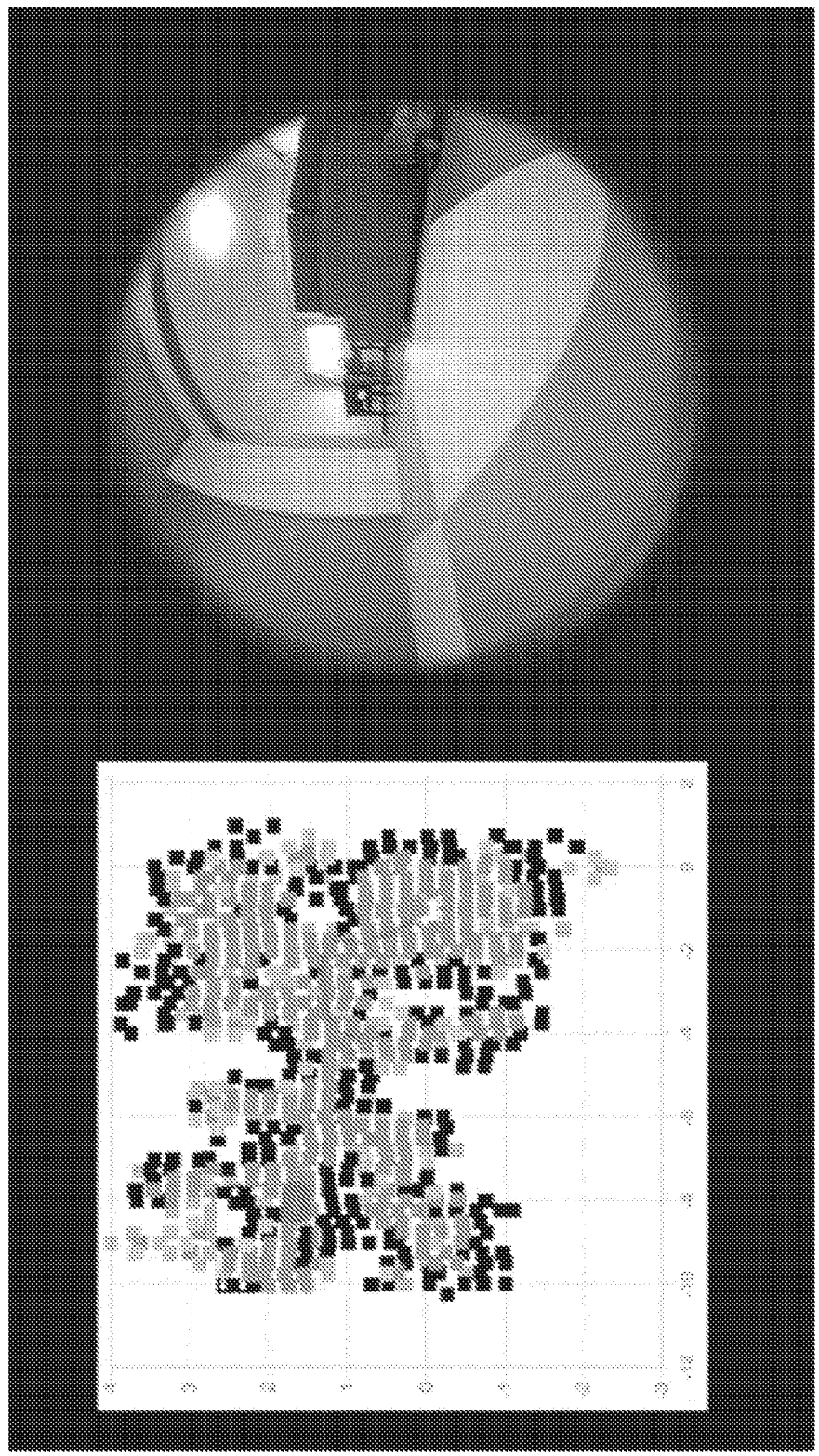
FIG. 28 is a diagram for explaining about movement control performed for moving to the space region corresponding to the specified area and about information acquisition according to the second embodiment.

FIG. 28 is a diagram for explaining about the movement control performed for moving to the space region corresponding to the specified area and about the information acquisition according to the second embodiment. In the left-hand side in FIG. 28 is illustrated the environmental map EM, and in the right-hand side in FIG. 28 is illustrated an example of the image photographed by the wide-angle camera (the camera 520) installed at the tip of the nose of the autonomous mobile object 10.

For example, based on the labeling that is performed in the environmental map EM or based on a speech such as "go to this place" by the user after the labeling is performed, the operation control unit 150 according to the second embodiment can move the autonomous mobile object 10 to the space region corresponding to the specified area that has been labeled. Moreover, in addition to performing the abovementioned movement control, the operation control unit 150 according to the second embodiment instructs the autonomous mobile object 10 to photograph an image of the concerned space region.

In this way, because of the operation control unit 150 according to the second embodiment, it becomes possible to collect, with high accuracy, the information related to that space region in the real space which corresponds to the specified area that has been labeled in the environmental map EM by the user. Meanwhile, image photographing need not be always performed immediately after the labeling. Alternatively, for example, after the labeling has been performed, when the autonomous mobile object 10 reaches the concerned space region during the autonomous movement, an image can be photographed.

The variety of information collected in the manner explained above is used in pattern recognition learning of the space region as performed in the autonomous mobile object 10. For example, the learning unit 130 of the autonomous mobile object 10 can perform pattern recognition learning by associating the label assigned via the interface UI2 and the image of the space region photographed in the manner explained above. Moreover, the learning unit 130 can learn about the images photographed in chronological order accompanying the movement to the space region (or can learn about the frames of a moving image) along with the concerned time series information, and thus can accurately learn about the features leading up to the concerned space region.

As a result of implementing the set of techniques explained above, it becomes possible to efficiently store annotated teacher learning data which is sharable among a plurality of autonomous mobile object 10 and in which the naming having no variations is associated to an image of the space region as actually viewed from the viewpoint of the autonomous mobile object 10 (i.e., an image photographed by the camera 520 installed at the tip of the nose); and the teacher learning data can be put to use in enhancing the accuracy of environment recognition in the autonomous mobile object 10. The sharing of the teacher learning data among a plurality of autonomous mobile objects 10 can be performed by the information processing server 20 by collecting and distributing the teacher learning data.

As a result of such a learning method, even if the autonomous mobile object 10 moves to an unlabeled space region, the name of that space region can be estimated based on the learning result.

Meanwhile, till now, the explanation was mainly given about the case in which the operation control unit 150 instructs the autonomous mobile object 10 to photograph images of the space regions. However, the information collection control according to the second embodiment is not limited to that example. That is, the operation control unit 150 according to the second embodiment can instruct the autonomous mobile object 10 to also collect a variety of sensor information related to the space regions.

For example, the operation control unit 150 according to the second embodiment can instruct the autonomous mobile object 10 to collect audio data related to the space regions. In that case, the learning unit 130 can perform learning by associating the audio data and labels. As a result, for example, based on the detection of the sound of flowing water, the recognizing unit 120 of the autonomous mobile object 10 becomes able to estimate that the space region at the current position is a riverside.

Moreover, for example, the operation control unit 150 according to the second embodiment can instruct the autonomous mobile object 10 to collect vibration data related to the space regions. In that case, the learning unit 130 can perform learning by associating the vibration data and labels. As a result, for example, based on the detection of vibrations characteristic to a vehicle, the recognizing unit 120 of the autonomous mobile object 10 becomes able to estimate that the space region at the current position is an expressway.

Furthermore, for example, the operation control unit 150 according to the second embodiment can instruct the autonomous mobile object 10 to collect sensor information related to smells of odor intensity in the space regions. In that case, the learning unit 130 can perform learning by associating the smell-related sensor information and labels. As a result, for example, based on the detection of a strong odor, the recognizing unit 120 of the autonomous mobile device 10 becomes able to estimate that the space region at the current position is a toilet.

Meanwhile, till now, although the explanation was given about the case in which the environmental map EM is a two-dimensional map, it can be expanded to be multidimensional in nature. For example, when the autonomous mobile object 10 is an unmanned aerial vehicle such as a drone capable of flying, the autonomous mobile object 10 can generate a SLAM map including the altitude information. In that case, the user can select a specified area having a specified altitude and then label the specified area.

Moreover, the environmental map EM according to the second embodiment can also include time information. In that case, the user can specify the time and the area and then assign a label (for example, evening sea). Furthermore, the environmental map EM according to the second embodiment can be defined along with metadata. For example, the environmental map EM according to the second embodiment can also contain six-dimensional information such as coordinates (x, y, z) of a room F on a floor E in a building D. Moreover, a plurality of environmental maps EM according to the second embodiment can also be generated. In that case, the user can perform labeling with respect to all environmental maps EM (for example, can assign a label "first floor" to an environmental map EM1 and a label "second floor" to an environmental map EM2).

Furthermore, the image as illustrated in FIG. 28 or the locus of movement of the autonomous mobile object 10 in the environmental map EM can be displayed in real time in the user interface UI2. As a result of confirming such information, the user becomes able to understand whether or not the specified area has been correctly recognized, can understand whether or not the autonomous mobile object 10 is moving correctly in the space region corresponding to the specified area, and can understand the manner in which the autonomous mobile object 10 is "looking at" the space region corresponding to the specified area. Meanwhile, the real-time display of the images and the environmental map EM is applicable in, for example, a monitoring system or a surveillance system.

«Flow of Teaching-Based Learning Using Environmental Map EM»

Figure 29:
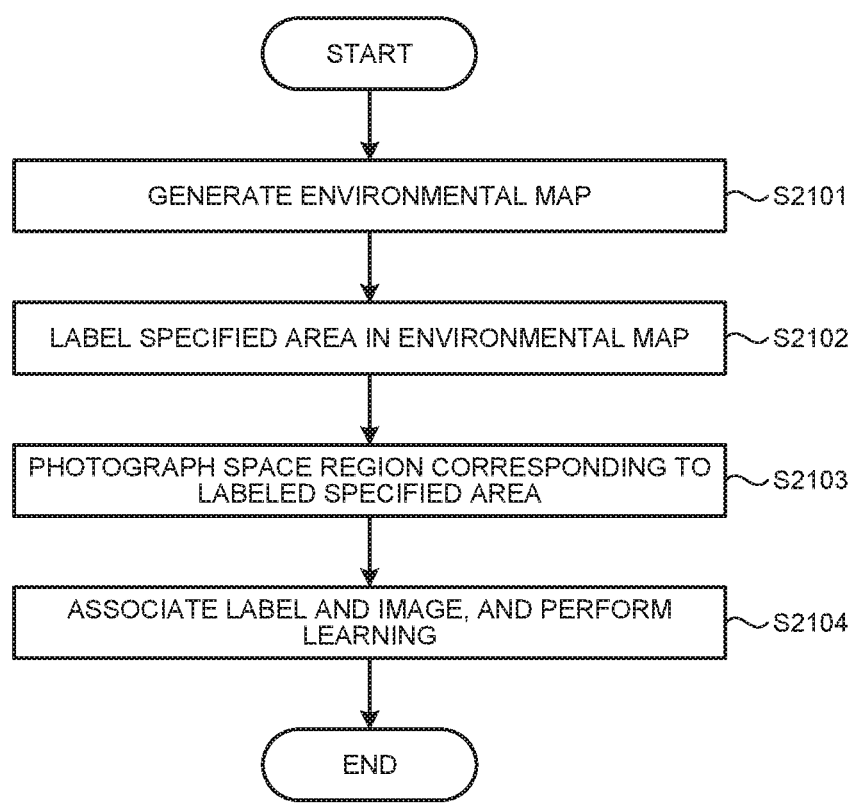
FIG. 29 is a flowchart for explaining an example of the flow of teaching-based learning using the environmental map according to the second embodiment.

Given below is the detailed explanation of the flow of teaching-based learning using an environmental map according to the second embodiment. FIG. 29 is a flowchart for explaining an example of the flow of teaching-based learning using the environmental map EM according to the second embodiment.

With reference to FIG. 29, firstly, based on the sensor information collected by the recognizing unit 120 of the autonomous mobile object 10, the environmental map EM is generated (S2101). Herein, the environmental map EM according to the second embodiment can be generated by the information processing server 20.

Then, the application control unit 240 of the information processing server 20 presents the environmental map EM, which is generated at Step S2101, to the user via the user interface UI2. The user selects an arbitrary specified area in the environmental map EM, and labels that specified area (S2102).

Subsequently, the operation control unit 150 of the autonomous mobile object 10 instructs the autonomous mobile object 10 to move to such a space region in the real space which corresponds to the specified area that is selected at Step S2101, and to collect sensor information (images) related to that space region (S2103).

Then, the learning unit 130 of the autonomous mobile object 10 associates the label assigned at Step S2102 and the sensor information collected at Step S2103, and performs pattern recognition learning regarding the space region (S2104).

3. Exemplary Hardware Configuration

Figure 30:
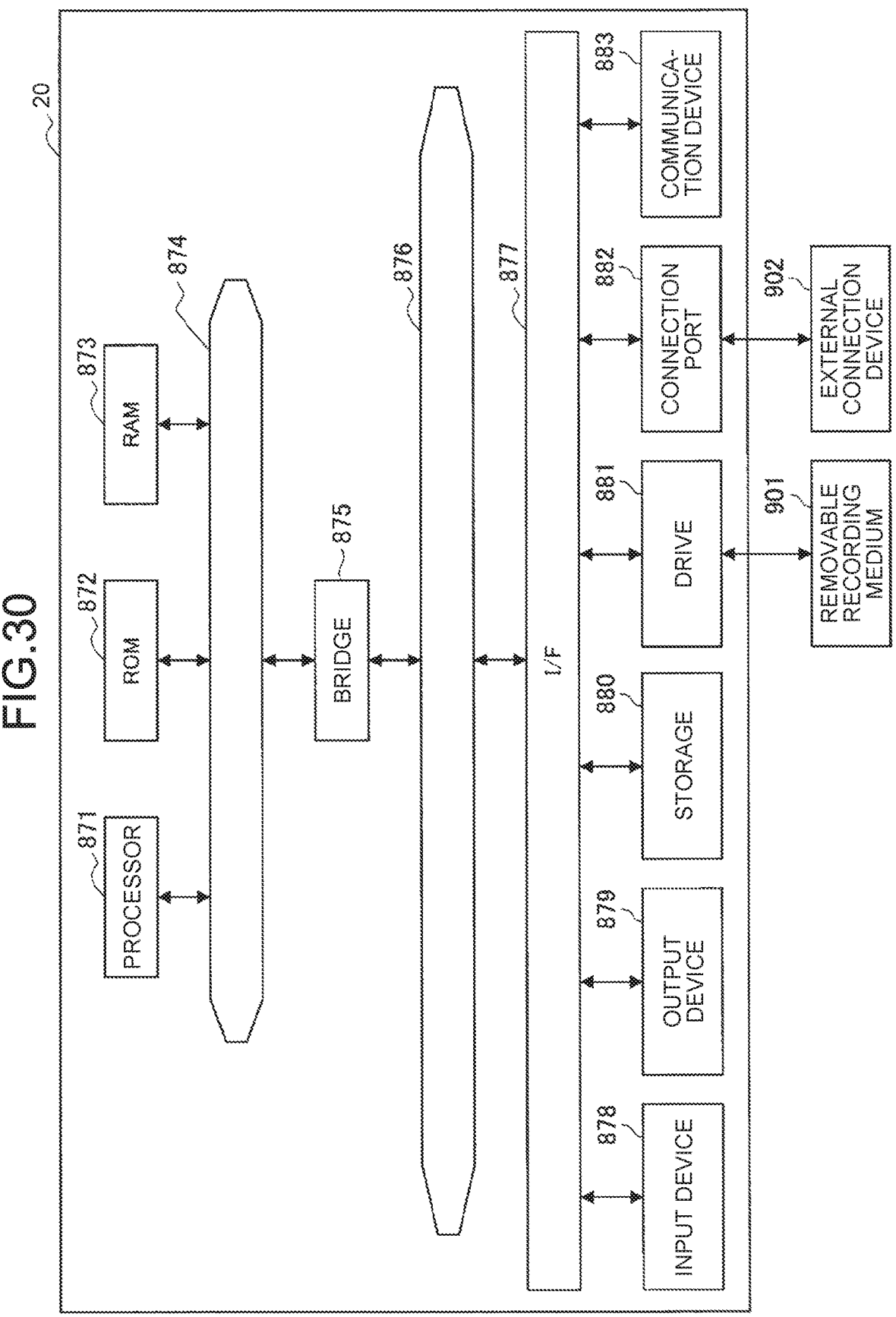
FIG. 30 is a block diagram illustrating an exemplary hardware configuration of the information processing server according to the embodiments of the application concerned.

Given below is the explanation of an exemplary hardware configuration of the information processing server 20 according to the embodiments of the application concerned. FIG. 30 is a block diagram illustrating an exemplary hardware configuration of the information processing server 20 according to the embodiments of the application concerned. With reference to FIG. 30, the information processing server 20 includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. However, this hardware configuration is only exemplary, and some of the constituent elements can be omitted. Moreover, some other constituent elements other than the illustrated constituent elements can be included.

(Processor 871)

The processor 871 functions as, for example, an arithmetic processing device or a control device, and controls, partially or entirely, the operations of the other constituent elements based on various programs recorded in the ROM 872, the RAM 873, the storage 880, or a removable recording medium 901.

(ROM 872 and RAM 873)

The ROM 872 is used to store programs to be read by the processor 871, and to store data to be used in operations. The RAM 873, for example, is used to store, temporarily or permanently, programs to be read by the processor 871 and to store various parameters that undergo appropriate changes during the execution of the programs.

(Host Bus 874, Bridge 875, External Bus 876, and Interface 877)

The processor 871, the ROM 872, and the RAM 873 are connected to each other via the host bus 874 that, for example, is capable of high-speed data transmission. Moreover, the host bus 874 is connected to the external bus 876, which has a relatively slower data transmission speed, via, for example, the bridge 875. Furthermore, the external bus 876 is connected to various constituent elements via the interface 877.

(Input Device 878)

Examples of the input device 878 include a mouse, a keyboard, a touch-sensitive panel, button switches, and levers. Moreover, as the input device 878, sometimes a remote controller is also used that is capable of transmitting control signals using infrared rays or other radio waves. Furthermore, the input device 878 includes an audio input device such as a microphone.

(Output Device 879)

The output device 879 is capable of notifying the user about the obtained information in a visual or auditory manner, and examples of the output device 879 include a display device such as a CRT (Cathode Ray Tube), an LCD, or an organic EL; an audio output device such as a speaker or headphones; a printer; a cellular phone; and a facsimile machine. Moreover, the output device 879 according to the application concerned includes various vibration devices capable of outputting tactile stimulation.

(Storage 880)

The storage 880 is used to store a variety of data. Examples of the storage 880 include a magnetic memory device such as a hard disk drive (HDD); a semiconductor memory device; an optical memory device; and a magneto-optical memory device.

(Drive 881)

The drive 881 reads information recorded in the removable recording medium 901 such as a magnetic disk, an optical disk, a magneto-optical disk, or a semiconductor memory; and writes information in the removable recording medium 901.

(Removable Recording Medium 901)

Examples of the removable recording medium 901 include a DVD media, a Blu-ray (registered trademark) media, an HD DVD media, and various semiconductor memory media. Of course, the removable recording medium 901 can be an IC card in which a noncontact-type IC chip is installed, or can be an electronic device.

(Connection Port 882)

The connection port 882 is a port such as a USB (Universal Serial Bus) port, an IEEE1394 port, an SCSI (Small Computer System Interface), an RS-232C port, or an optical audio terminal that enables establishing connection with an external connection device 902.

(External Connection Device 902)

Examples of the external connection device 902 include a printer, a portable music player, a digital camera, a digital video camera, and an IC recorder.

(Communication Device 883)

The communication device 883 enables establishing connection with a network, and examples of the communication device 883 include a communication card for a wired LAN, or a wireless LAN, or Bluetooth (registered trademark), or WUSB (Wireless USB); an optical communication router; an ADSL (Asymmetric Digital Subscriber Line) router; and various communication modems.

4. Summary

As explained above, the autonomous mobile object 10 according to the embodiments of the application concerned includes the operation control unit 150 that controls the operations of the autonomous mobile object 10. As one of the features of the operation control unit 150 according to the embodiments of the application concerned, when the start of teaching related to pattern recognition learning is detected, the autonomous mobile object 10 is instructed to obtain the information regarding the learning target that is to be learnt in a corresponding manner to a taught label. With such a configuration, the learning related to pattern recognition can be performed with more efficiency.

Although the application concerned is described above in detail in the form of embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth. In any form thereof, as long as the functions/effects of the application concerned are achieved, the modifications are included in the scope of the application concerned.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, it is also possible to create a program for making the hardware of a computer including a CPU, a ROM, and a RAM implement functions equivalent to the configuration of the autonomous mobile object 10 or the information processing server 20. Moreover, it is possible to provide a computer-readable recording medium in which that program is recorded.

Meanwhile, the steps of the operations performed by the autonomous mobile object 10 in the present written description need not necessarily be processed chronologically according to the order given in sequence diagrams and flowcharts. For example, the steps of the operations performed by the autonomous mobile object 10 can be processed in a different order than the order given in flowcharts, or can be processed in parallel.

Meanwhile, a configuration as explained below also falls within the technical scope of the application concerned.

(1)

An information processing device comprising an operation control unit that controls operation of an autonomous mobile object which performs an action according to a recognition operation, wherein based on detection of start of teaching related to pattern recognition learning, the operation control unit instructs the autonomous mobile object to obtain information regarding a learning target that is to be learnt in a corresponding manner to a taught label.

(2)

The information processing device according to (1), wherein the learning target includes a space region, and based on the label assigned in an environmental map that is generated based on sensor information collected by the autonomous mobile object, the operation control unit instructs the autonomous mobile object to obtain information regarding the space region.

(3)

The information processing device according to (2), wherein the operation control unit instructs the autonomous mobile object to move, in real space, to the space region that corresponds to a specified area to which the label is assigned in the environmental map.

(4)

The information processing device according to (3), wherein the operation control unit instructs the autonomous mobile object to photograph the space region corresponding to the specified region.

(5)

The information processing device according to any one of (2) to (4), wherein the environmental map is generated or updated using SLAM technology.

(6)

The information processing device according to (1), wherein the operation control unit controls position or posture of the autonomous mobile object in such a way that learning target is photographed from a plurality of angles.

(7)

The information processing device according to (1) or (2), wherein the operation control unit controls position or posture of the autonomous mobile object in such a way that the learning target is photographed in entirety.

(8)

The information processing device according to (7), wherein the operation control unit controls position or posture of the autonomous mobile object based on result of boundary recognition performed regarding the learning target.

(9)

The information processing device according to (1) or any one of (6) to (10), wherein the teaching is performed by a user, and the operation control unit instructs the autonomous mobile object to photograph the learning target identified based on instruction from the user.

(10)

The information processing device according to (9), wherein instruction from the user is given using a gesture.

(11)

The information processing device according to (1) or any one of (6) to (10), wherein the teaching is performed based on information obtained from the learning target.

(12)

The information processing device according to (11), wherein the teaching is performed by photographing a marker assigned to the learning target.

(13)

The information processing device according to (11) or (12), wherein the teaching is performed based on information sent from the learning target using wireless communication.

(14)

The information processing device according to any one of (11) to (13), wherein the teaching is performed based on an inaudible sound emitted from the learning target.

(15)

The information processing device according to (9) or (10), wherein the label is extracted from speech of the user.

(16)
The information processing device according to (1) or any one of (6) to (15), wherein
the learning target includes an object, and
the operation control unit instructs the autonomous mobile object to photograph the object identified based on the teaching.
(17)
The information processing device according to (1) or any one of (6) to (16), wherein
the learning target includes an action of an object, and
the operation control unit instructs the autonomous mobile object to obtain information regarding the action of the object identified based on the teaching.
(18)
The information processing device according to (1) or any one of (6) to (17), wherein
the learning target includes a space region, and
the operation control unit instructs the autonomous mobile object to obtain information regarding the space region identified based on the teaching.
(19)
The information processing device according to (1) or any one of (6) to (18), wherein the operation control unit instructs the autonomous mobile object to perform an action indicating that the pattern recognition learning has started or ended.
(20)
The information processing device according to (1) or any one of (6) to (19), wherein the operation control unit instructs the autonomous mobile object to perform a guiding operation to guide user to perform the teaching.
(21)
The information processing device according to any one of (1) to (20), further comprising an application control unit that controls a user interface to be used in associating the label regarding the pattern recognition learning and the learning target.
(22)
The information processing device according to (21), wherein the application control unit provides a way, in the user interface, for user to specify an arbitrary specified area in an environmental map and to assign the label to the specified area.
(23)
The information processing device according to (22), wherein the application control unit presents, in the user interface, candidates for the label assignable to the specified area by user.
(24)
The information processing device according to (21), wherein the application control unit provides a way, in the user interface, for user to correct association of the label and the learning target.
(25)
The information processing device according to any one of (1) to (24), further comprising a learning unit that performs the pattern recognition learning based on the label and based on an image of the learning target.
(26)
An information processing method implemented in a processor, comprising:
controlling operation of an autonomous mobile object which performs an action according to a recognition operation, wherein
based on detection of start of teaching related to pattern recognition learning, the controlling of the operation includes instructing the autonomous mobile object to obtain information regarding a learning target that is to be learnt in a corresponding manner to a taught label.
(27)
A program that causes a computer to function as an information processing device including an operation control unit that controls operation of an autonomous mobile object which performs an action according to a recognition operation, wherein
based on detection of start of teaching related to pattern recognition learning, the operation control unit instructs the autonomous mobile object to obtain information regarding a learning target that is to be learnt in a corresponding manner to a taught label.

REFERENCE SIGNS LIST 10 autonomous mobile object
110 input unit
120 recognizing unit
130 learning unit
140 action planning unit
150 operation control unit
160 driving unit
170 output unit
510 display
570 actuator
20 information processing server
210 recognizing unit
220 learning unit
230 memory unit
240 application control unit

The invention claimed is:
1. An information processing device, comprising:
a central processing unit (CPU) configured to:
detect a start of a teaching operation related to a pattern recognition learning operation;
identify a learning target based on a gesture of a user;
control, based on the detection of the start of the teaching operation related to the pattern recognition learning operation, operation of an autonomous mobile object to perform a first action;
determine that the identified learning target is not used by the user for a specific period of time;
instruct, based on the detection of the start of the teaching operation related to the pattern recognition learning operation, the autonomous mobile object to obtain information regarding the learning target that is to be learnt in a corresponding manner to a label associated with the teaching operation related to the pattern recognition learning operation; and
instruct, based on the determination that the identified learning target is not used by the user for the specific period of time, the autonomous mobile object to execute a second action, wherein the second action is different from the first action.
2. The information processing device according to claim 1, wherein
the learning target includes a space region,
the CPU is further configured to instruct, based on the label assigned in an environmental map, the autonomous mobile object to obtain information regarding the space region, and
the environmental map is generated based on sensor information collected by the autonomous mobile object.

3. The information processing device according to claim 2, wherein the CPU is further configured to instruct the autonomous mobile object to move, in real space, to the space region that corresponds to an area to which the label is assigned in the environmental map.

4. The information processing device according to claim 3, wherein the CPU is further configured to instruct the autonomous mobile object to photograph the space region corresponding to the area.

5. The information processing device according to claim 2, wherein the environmental map is one of generated or updated based on simultaneous localization and mapping (SLAM) technology.

6. The information processing device according to claim 1, wherein the CPU is further configured to control one of a position or a posture of the autonomous mobile object to photograph the learning target from a plurality of angles.

7. The information processing device according to claim 1, wherein the CPU is further configured to control one of a position or a posture of the autonomous mobile object to photograph the learning target in entirety.

8. The information processing device according to claim 7, wherein the CPU is further configured to control one of a position or a posture of the autonomous mobile object based on a result of boundary recognition executed regarding the learning target.

9. The information processing device according to claim 1, wherein the teaching operation is performed by the user.

10. The information processing device according to claim 1, wherein the teaching operation is executed based on information obtained from the learning target.

11. The information processing device according to claim 10, wherein the teaching operation is executed by photographing operation on a marker assigned to the learning target.

12. The information processing device according to claim 10, wherein the teaching operation is executed based on information sent from the learning target using wireless communication.

13. The information processing device according to claim 10, wherein the teaching operation is executed based on an inaudible sound emitted from the learning target.

14. The information processing device according to claim 1, wherein the label is extracted from speech of the user.

15. The information processing device according to claim 1, wherein
the learning target includes an object, and
the CPU is further configured to instruct the autonomous mobile object to photograph the object identified based on the teaching operation.

16. The information processing device according to claim 1, wherein
the learning target includes a third action of an object, and
the CPU is further configured to instruct the autonomous mobile object to obtain information regarding the third action of the object identified based on the teaching operation.

17. The information processing device according to claim 1, wherein
the learning target includes a space region, and
the CPU is further configured to instruct the autonomous mobile object to obtain information regarding the space region identified based on the teaching operation.

18. The information processing device according to claim 1, further comprising an application control unit configured to control a user interface to associate the label regarding the pattern recognition learning operation and the learning target.

19. The information processing device according to claim 18, wherein the application control unit is further configured to provide a way, in the user interface, for the user to specify an area in an environmental map and to assign the label to the area.

20. The information processing device according to claim 19, wherein the application control unit is further configured to present, in the user interface, a plurality of candidates for the label assignable to the area by the user.

21. The information processing device according to claim 18, wherein the application control unit is further configured to provide a way, in the user interface, for the user to correct the association of the label and the learning target.

22. The information processing device according to claim 1, further comprising a learning unit configured to perform the pattern recognition learning operation based on the label and an image of the learning target.

23. An information processing method, comprising:
detecting a start of a teaching operation related to a pattern recognition learning operation;
identifying a learning target based on a gesture of a user;
controlling, based on the detection of the start of the teaching operation related to the pattern recognition learning operation, operation of an autonomous mobile object to perform a first action;
determining that the identified learning target is not used by the user for a specific period of time;
instructing, based on the detection of the start of the teaching operation related to the pattern recognition learning operation, the autonomous mobile object to obtain information regarding the learning target that is to be learnt in a corresponding manner to a label associated with the teaching operation related to the pattern recognition learning operation; and
instructing, based on the determination that the identified learning target is not used by the user for the specific period of time, the autonomous mobile object to execute a second action, wherein the second action is different from the first action.

24. A non-transitory computer-readable medium having stored thereon, computer-executable instructions which, when executed by a computer, cause the computer to execute operations, the operations comprising:
detecting a start of a teaching operation related to a pattern recognition learning operation;
identifying a learning target based on a gesture of a user;
controlling, based on the detection of the start of the teaching operation related to the pattern recognition learning operation, operation of an autonomous mobile object to perform a first action;
determining that the identified learning target is not used by the user for a specific period of time;
instructing, based on the detection of the start of the teaching operation related to the pattern recognition learning operation, the autonomous mobile object to obtain information regarding the learning target that is to be learnt in a corresponding manner to a label associated with the teaching operation related to the pattern recognition learning operation; and instructing, based on the determination that the identified learning target is not used by the user for the specific period of time, the autonomous mobile object to execute a second action, wherein the second action is different from the first action.

* * * * *